US012008860B2

(12) United States Patent
DiCarlo

(10) Patent No.: US 12,008,860 B2
(45) Date of Patent: Jun. 11, 2024

(54) NETWORKED SLOT MACHINE SYSTEM WITH COMPETITIVE DUAL MODE WAGERING

(71) Applicant: Fernando DiCarlo, Woodbridge (CA)

(72) Inventor: Fernando DiCarlo, Woodbridge (CA)

( * ) Notice: Subject to any disclaimer, the term of this patent is extended or adjusted under 35 U.S.C. 154(b) by 0 days.

(21) Appl. No.: 17/353,753

(22) Filed: Jun. 21, 2021

(65) Prior Publication Data

US 2023/0186720 A1 Jun. 15, 2023

Related U.S. Application Data

(63) Continuation of application No. 16/430,424, filed on Jun. 4, 2019, now Pat. No. 11,043,067, which is a continuation of application No. 15/004,760, filed on Jan. 22, 2016, now Pat. No. 10,354,482.

(51) Int. Cl.
*G07F 17/32* (2006.01)
*G07F 17/34* (2006.01)

(52) U.S. Cl.
CPC ...... *G07F 17/3225* (2013.01); *G07F 17/3213* (2013.01); *G07F 17/3267* (2013.01); *G07F 17/34* (2013.01)

(58) Field of Classification Search
CPC ............. G07F 17/3225; G07F 17/3213; G07F 17/3267; G07F 17/34; G07F 17/32
USPC ............................................... 463/20; 705/14
See application file for complete search history.

(56) References Cited

U.S. PATENT DOCUMENTS 9,084,931 B2 * 7/2015 Herrmann ............... G07F 17/32
2009/0170610 A1 * 7/2009 Herrmann ........... G07F 17/3237 463/43
2009/0170611 A1 * 7/2009 Herrmann ............... G07F 17/32 463/43
2009/0170612 A1 * 7/2009 Herrmann ........... G07F 17/3237 463/43
2009/0170613 A1 * 7/2009 Herrmann ............... G07F 17/32 463/43
2009/0170614 A1 * 7/2009 Herrmann ........... G07F 17/3237 463/43
2011/0218024 A1 * 9/2011 Baerlocher ............. G07F 17/32 463/16
2011/0269548 A1 * 11/2011 Barclay ............... G07F 17/3274 463/43
2013/0005424 A1 * 1/2013 Baerlocher ............. G07F 17/32 463/16
2013/0090750 A1 * 4/2013 Herrman ................... A63F 9/24 700/92
2013/0102374 A1 * 4/2013 Barclay ............... G07F 17/3255 463/16

(Continued)

*Primary Examiner* — Pierre E Elisca
(74) *Attorney, Agent, or Firm* — Muskin and Farmer LLC

(57) ABSTRACT

An electronic system to implement a networked interactive game. A slot machine game based on a random number generator operates alongside a side game which can require physical dexterity. Awards from both the slot machine game and the side game are combined and accumulated throughout the game. Computer generated animation is utilized to enhance the side game and provide opportunity for the player to use dexterity to earn more credits. A plurality of machines are networked and communicate their scores (win points) to a central server which administers the game and identifies each winning machine and its respective award.

2 Claims, 34 Drawing Sheets

(56) References Cited

U.S. PATENT DOCUMENTS

2015/0099576 A1 * 4/2015 Anderson ........... G07F 17/3244
463/25

* cited by examiner

LEADERBOARD

| MACHINE # | WIN CREDITS | PRIZE |
|---|---|---|
| 18 | 12,743 | $40 |
| 03 | 12,740 | $30 |
| 04 | 11,220 | $15 |
| 11 | 9,840 | $5 |
| 17 | 9,020 | $0 |
| 08 | 8,700 | $0 |
| 01 | 7,840 | $0 |
| 14 | 7,350 | $0 |
| 06 | 7,105 | $0 |
| 02 | 6,550 | $0 |
| 16 | 6,250 | $0 |
| 05 | 6,250 | $0 |
| 15 | 4,750 | $0 |
| 07 | 4,250 | $0 |
| 20 | 3,840 | $0 |
| 10 | 3,050 | $0 |
| 09 | 2,547 | $0 |

FIGURE 11

NETWORKED SLOT MACHINE SYSTEM WITH COMPETITIVE DUAL MODE WAGERING

BACKGROUND OF THE INVENTION

Field of the Invention

The present general inventive concept is directed to a method, apparatus, and computer readable storage medium directed to an entertainment system enabling players to compete against one another. U.S. application Ser. No. 15/004,760 is incorporated by reference in its entirety.

Description of the Related Art

Electronic games are a huge industry in the United States and throughout the world. What is needed is a new casino game that will be profitable for the house and exciting and enjoyable for players.

SUMMARY OF THE INVENTION

It is an aspect of the present invention to provide an electronic interactive and entertaining game.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 11 is a drawing of an exemplary leaderboard displayed to all of the players, according to an embodiment;

DESCRIPTION OF THE PREFERRED EMBODIMENTS

Figure 1:
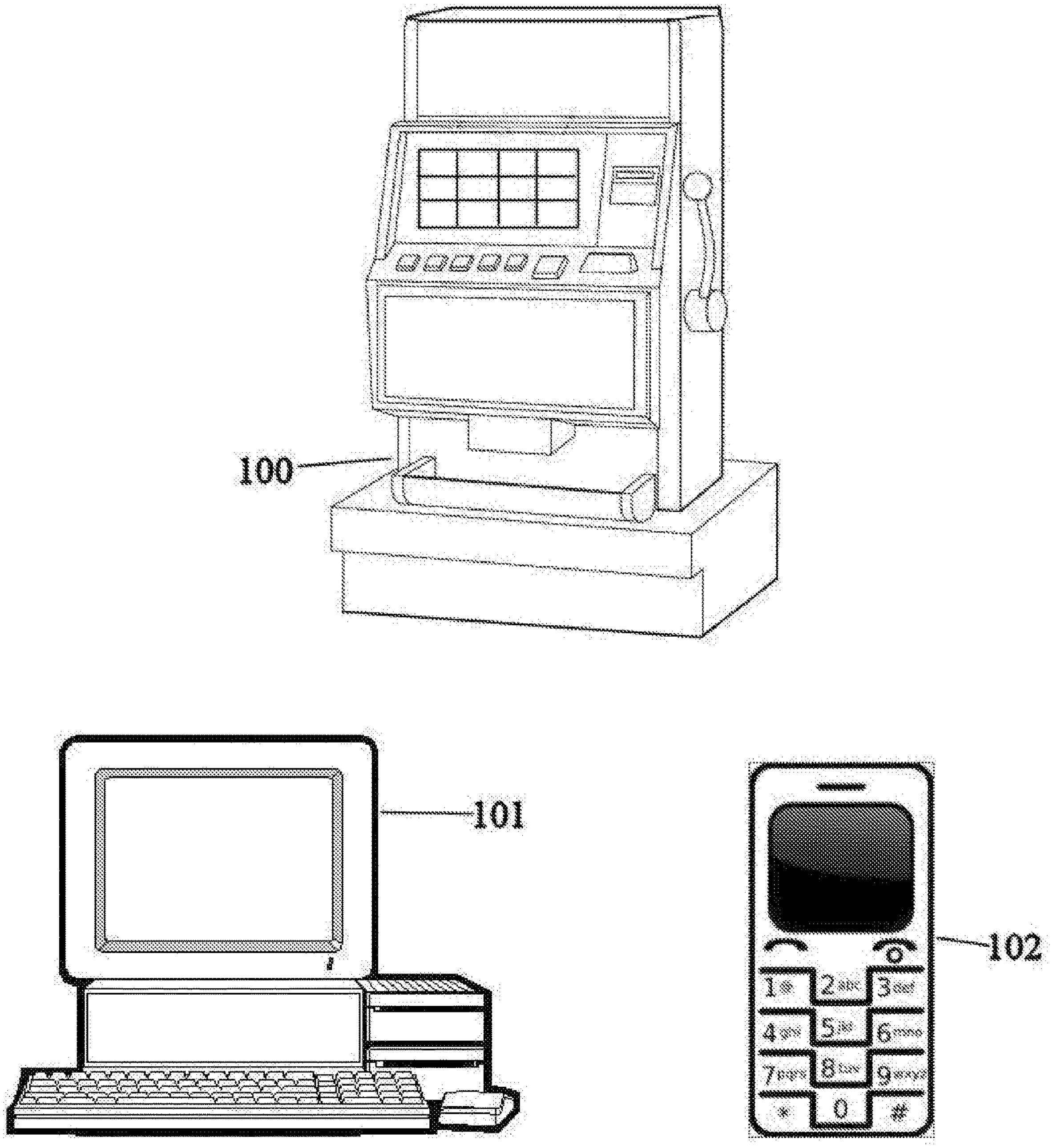
FIG. 1 is a drawing of different hardware that the methods herein can be played on, according to an embodiment.

Reference will now be made in detail to the presently preferred embodiments of the invention, examples of which are illustrated in the accompanying drawings, wherein like reference numerals refer to like elements throughout.

The present inventive concept relates to a method, apparatus, and computer readable storage medium to implement a game which can be implemented across many machines simultaneously. These machines can all compete with each other in a tournament and the winning players using their respective machines would be awarded prizes. The players can pay real money to enter the tournament.

FIG. 1 is a drawing of different hardware that the methods herein can be played on, according to an embodiment.

The game described herein can be played by players on a typical electronic gaming machine (e.g., slot machine), a personal computer (or laptop) 101, or a cell (mobile) phone 102. Each of these devices would be connected to a network which would be connected to a server 500. The connection can be via a physical LAN, wireless connection (e.g., WIFI, Bluetooth, etc.) simple cables, etc.

Figure 2:
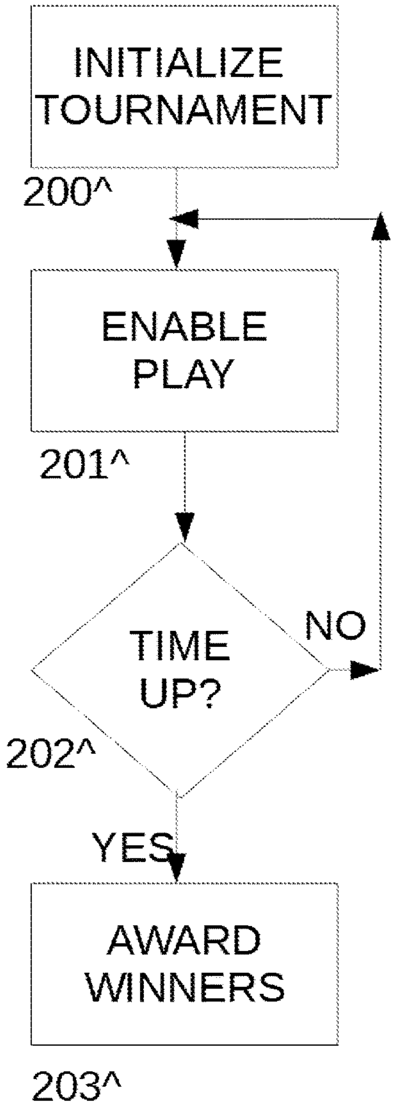
FIG. 2 is flowchart illustrating an exemplary method of implementing a tournament on a higher level, according to an embodiment.

FIG. 2 is flowchart illustrating an exemplary method of implementing a tournament on a higher level, according to an embodiment.

In operation 200, a tournament is initialized. A tournament can last for a predetermined time period (e.g., 3 minutes, etc.) Each of the slot machines (or computers) in the tournament would have two values: play credits and win credits. The play credits are used to play the game and each time the reels are spun one (or other amount) of play credits is deducted from the play credits. If the play credits on a machine reaches zero, then that player has finished the tournament and their score is finalized. Typically, each machine would be given ample play credits (e.g., 1,000) so that the player could typically continuously play the machine throughout the finite time of the tournament without using up all of the play credits. Each machine's win credits would be initialized to zero. The current value of both win credits and play credits is typically displayed to the player at all times during the tournament.

Figure 4:
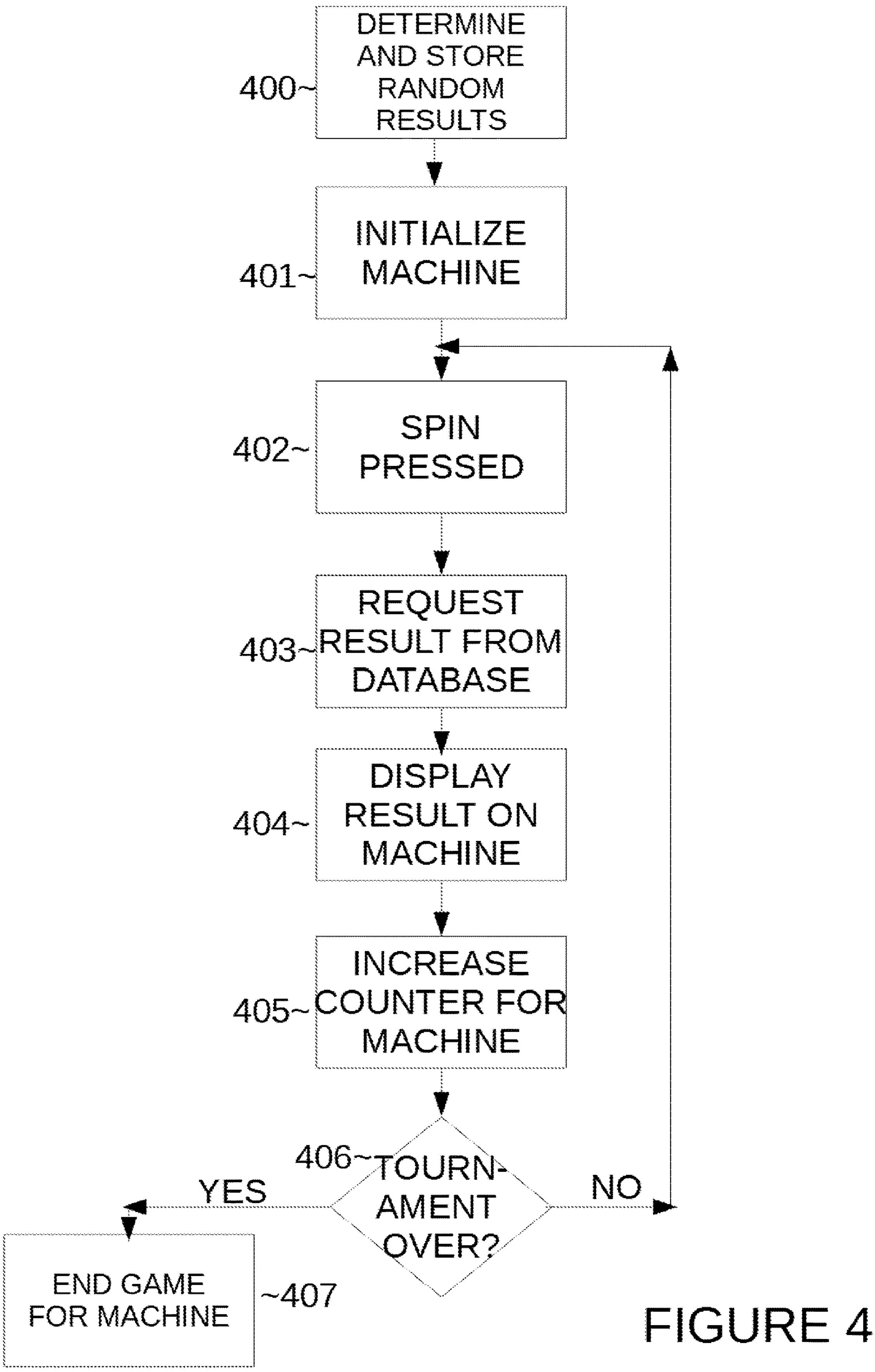
FIG. 4 is a flowchart illustrating an exemplary method of utilizing identical results for each machine during a particular tournament, according to an embodiment.

In addition, in operation 200 predetermined results for each of the slot machine spins can be determined as well (see FIG. 4). The pointer for each machine is initialized to the beginning of the result list (e.g., 1). Note that each slot machine in each particular tournament would receive the same results for every spin in the same order. Even though different players may play at a different spin, each particular spin by each player (machine) in the tournament will be the spin. For example, the $100^{th}$ spin will have the same result on all machines playing in the tournament, even though the times that each machine reaches the $100^{th}$ spin may be different. In this way, since all machines will have the same outcomes, the differentiating factor between one player and another would be each player's skill.

Each player in the tournament would have to buy in and pay a cash fee to participate and for the potential to win the cash prizes. For example, each player must pay an entry fee of $2.00 (or any other amount) which can be paid in cash (or paid electronically) in order to be able to sit at a machine and participate in the tournament.

From operation 200, the method proceeds to operation 201, which enables play of the tournament. This entails allowing each player in the tournament to independent play their slot machine. This entails pressing the spin button, which would automatically deduct one credit (or more) from the machine's play credits. The results of the spin would stop at the predetermined outcome for that spin. If the outcome (a combination of symbols) matches a predetermined combination then the player would win a corresponding award for that combination and the award would be automatically added to the player's win credits. The goal of the tournament is to complete the tournament with as many win credits as possible.

From operation 201, the method proceeds to operation 202, which determines whether the tournament is over (e.g., the time for the tournament has expired). If not, and the player still has play credits left, then the method returns to operation 201.

If in operation 202, the time is up, then the method proceeds to operation 203, which ends the tournament. All players' scores (the win credits) are displayed on a leaderboard (or other output device such as an LCD, etc.) and the winning players (the players with the highest win credits) are determined. Their prizes are determined (based on a respective proportion of the overall prize pool) and then the winning players are awarded their prizes. The winning players can be awarded their prizes in numerous ways, such as paying them cash, providing them a voucher which can be redeemed at a ticket redemption machine for cash (or at a cashier for cash), the prize can be electronically wired to the player's account, the player can receive a check, etc.

Figure 3:
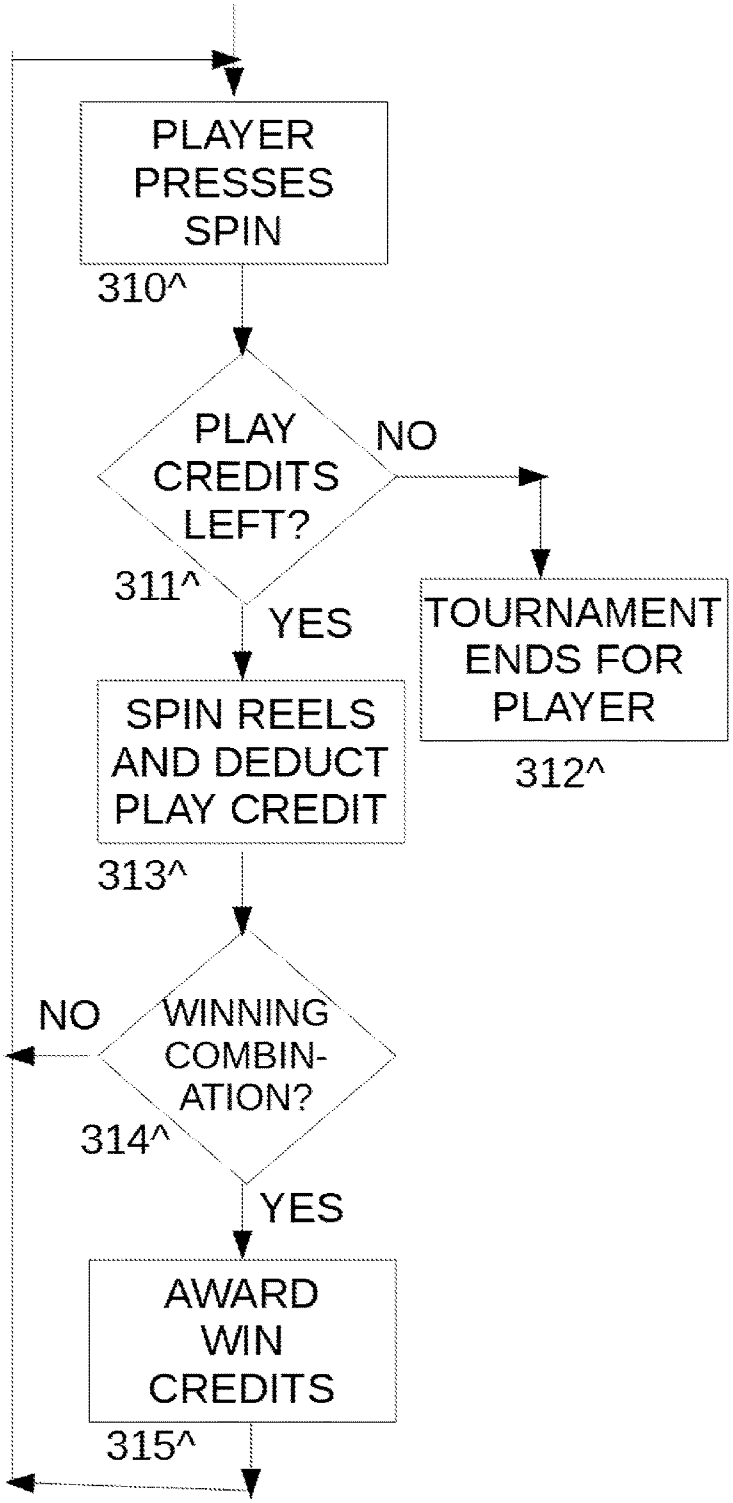
FIG. 3 is a flowchart illustrating an exemplary method of implementing a tournament on a machine level, according to an embodiment.

FIG. 3 is a flowchart illustrating an exemplary method of implementing a tournament on a machine level, according to an embodiment.

In operation 310, the player presses the spin button on the player's own machine (one particular machine per player).

From operation 310, the method proceeds to operation 311, which determines whether there are any play credits left. If there are no play credits left, then the method proceeds to operation 312 in which the tournament ends for this particular player. Note that the time for the tournament may not be up yet and so this player will still have to wait for the allotted time for the tournament to be over so the winners (and their prizes) can be determined. Note that the play credits and the win credits are two separate quantities, the play credits are used to play the game (spin the reels) and the win credits accumulate all awards that have been won from winning spins (outcomes).

In operation 311, if there are play credits left, then the method proceeds to operation 312, which spins the reels and deducts one (or more) play credits from the player's total amount of play credits. The quantity of play credits is displayed to the player and updated in real time. The reels will spin (using computer animation to animate virtual reels, although the methods described herein can also be played on physical mechanical slot machine as well) and will stop at an outcome.

From operation 313, the method proceeds to operation 314, which determines whether the outcome is a winning combination. If not, then the method returns to operation 310 so that the player can continue playing.

If in operation 314, it is determined that the combination (outcome) from operation 313 is a winning combination then the method proceeds to operation 315. The combination would be a winning combination if symbols that are along a payline match a predetermined paytable of winning combinations. A payline is a predetermined path of symbols from left to right on the grid (the 3 by 5 array of symbols, although any other dimensions can be used as well).

In one embodiment, the results (outcomes) of each slot machine spin are randomly determined on each machine (as typical in a casino). In another embodiment, the results (outcomes) of each slot machine spin are all predetermined and will be identical for each player. In other words, random outcomes for N spins (N is the maximum number of spins possible in a game) are determined and stored in a database (or any computer where the results can be retrieved and transmitted to all of the slot machines participating in the tournament). All of the outcomes have a number (e.g., outcome for the first spin, outcome for the second spin etc.) Thus, each numbered spin (outcome) for different machines will be the same. For example, the first spin on all of the machines in the tournament will have the same outcome, the second spin on all of the machines in the tournament will have the same outcome, etc. Different players will play at different speeds (each player has to press the spin button in order to initiate a spin) so one player in the tournament may be on the $20^{th}$ spin while another player in the tournament may be simultaneously on the $25^{th}$ spin. The outcomes will thus eventually be all the same for all players. However, note that the player who plays at a faster rate may be able to get in more spins than a slower player before the allotted time has expired. Thus, the slower player may not experience the last spins that the faster player would have experienced, thereby giving the faster player an advantage.

FIG. 4 is a flowchart illustrating an exemplary method of utilizing identical results for each machine during a particular tournament, according to an embodiment.

In operation 400, a database (or other such computer) determines and stores random results for all possible spins in the tournament. The results can be determined by emulating the slot machine math present on each of the slot machines in the tournament. Each reel will stop at a random position, and the positions of all five reels will then be stored (note that other dimensions of a slot machine can be used aside from 5 by 3, such as 4 by 4, 3 by 3, etc.). Each reel will have a predetermined number of symbols on the reel which will match all of the reel configurations of the slot machines in the tournament. Each random outcome is determined by randomly selecting (using a random number generator, either software or hardware based) a random position for each of the five reels which are then stored. Table I below illustrates one possible reel configuration:

TABLE I

| Position | symbol |
|---|---|
| 1 | wild |
| 2 | blank |
| 3 | flower |
| 4 | present |
| 5 | bicycle |
| 6 | star |
| 7 | star |
| 8 | flag |
| 9 | flower |
| 10 | blank |
| 11 | star |
| 12 | bicycle |
| 13 | spider |
| 14 | spider |
| 15 | star |
| 16 | wild |
| 17 | bicycle |
| 18 | star |
| 19 | shield |
| 20 | 7 |
| 21 | star |
| 22 | present |
| 23 | pepper |
| 24 | star |

The reels in the slot machine can all be identical or can all use different configurations. While the example reel shown in Table I has 24 stops (positions on the reels), other numbers of stops can be used as well. So for example, in FIG. 9, the random outcome determined by the database for this spin is 4, 18 8, 12, 23, the numbers representing the reel stop that will be in the vertical center of the outcome. Thus, for each outcome, a set of five such numbers (for a five reel slot) is generated and stored along with an identifier of the spin number.

Operation 400 can be performed for each new tournament and there will be no way for players to be able to predict what the predetermined outcomes before the tournament begins. Note that a different set of outcomes would be used in different tournaments, in other words after a tournament is completed then an entirely new set of outcomes (in operation 400) would be generated for the next tournament. In this way it would not be possible at the start of a new tournament to predict any of the outcomes. However, in the same tournament, if one player is playing slower than another player then the slower player (if looking at the faster player's machine) would be able to see the future outcome(s) that the slower player will get since the outcomes will ultimately be the same for different machines during the same tournament.

From operation 400, the method proceeds to operation 401, which initializes each machine. In the case where the tournament is being played on personal computing devices instead of gaming (slot) machines, then "machine" refers to the personal computing device (e.g., cell phone, tablet, laptop computer, etc.) and all operations that would be performed on a gaming machine would be performed on the personal computing device. This sets a spin pointer for each machine to 1, meaning that the upcoming spin on the machine will be retrieved from the database and will be the first entry (record) in the pre-generated spins. The number of win credits will also be set to zero at machine, since at the start of each tournament all machines will start with a win credits of zero. Each player's goal in the tournament is to get the most win credits. A predetermined equal amount of play credits will also be assigned to each player/machine, for example 20,000 (which would typically be more than the player would possible be able to use up during the limited time of the tournament).

In operation 401, the counter (also referred to as spin counter) for the machine is reset to 1. This points to the respective predetermined outcome that was determined in operation 400. The first spin will retrieve and display the first outcome and the counter will be increased (in operation 405) so on the second spin the second outcome will be retrieved and displayed, etc. Each machine will have its own counter.

From operation 401, the method proceeds to operation 402, wherein the player presses the spin button on his/her machine. This will deduct one (or more) play credits from the player's machine. If the player does not have any play credits left then the reels will no longer spin and this machine will stop playing and will wait until the tournament is over. There is no way a player/machine can be disqualified from the tournament.

From operation 402, the method proceeds to operation 403, the slot machine will request the next result from the database. Either the database will maintain a spin counter for each particular machine or each particular machine can maintain its own spin counter and will transmit the spin counter to the database so the database can respond with the respective outcome for that machine's spin counter.

From operation 403, the method proceeds to operation 404, which will receive the next result (the positions of all of the reels when the spinning stops) from the database and map that to an outcome on the slot machine. The slot machine will utilize computer generated animation (or spin physical reels if a mechanical slot machine is used) to spin the reels and will stop utilizing the outcome (each reel will stop on its predetermined position). The slot machine will display the animation and stop the reels on the predetermined outcome based on the spin counter such that the player will have no way of knowing that each result is predetermined and not independently generated at each machine. If the outcome is a winning combination, then the win credits will be increased by a respective award based on the combination. The award is determined by summing up all winning payouts on each payline. The symbols on each payline are compared to a paytable of all winning combinations and any matches are awarded a respective amount of win credits. This is done for each payline and in theory each payline could earn an award (as long as its symbols match a winning combination on the paytable). The win credits will be increased by all awards earned on each payline but it is possible a spin would have no winning combinations which means an award of zero and hence the win credits will not be increased. Each machine will typically display the amount of win credits that the player has earned so far in the tournament (it is a running total of all win credits earned).

From operation 404, the method proceeds to operation 405, which increases (typically by one) the spin counter for each machine. The spin counter points to the next outcome for each particular machine.

From operation 405, the method proceeds to operation 406, which determines whether the tournament is over. If the allotted time for the tournament is not over, then the method returns to operation 402. The server/database will maintain a game clock which begins timing once the tournament begins so it can stop the tournament when the tournament allotted time is over (e.g., two minutes).

If in operation 406, the allotted time for the tournament is over, then the method proceeds to operation 407. The server/database will transmit a signal to all of the machines in the tournament that the tournament is over and stop serving slot machine outcomes, and hence all of the machines will stop playing. Now each player's machine can be evaluated, the winners determined, and the prizes awarded.

All players in a particular tournament would typically all start at the same time. In another embodiment, all players in a particular tournament can begin at different times (although as described herein the outcomes will still be the same).

Figure 5:
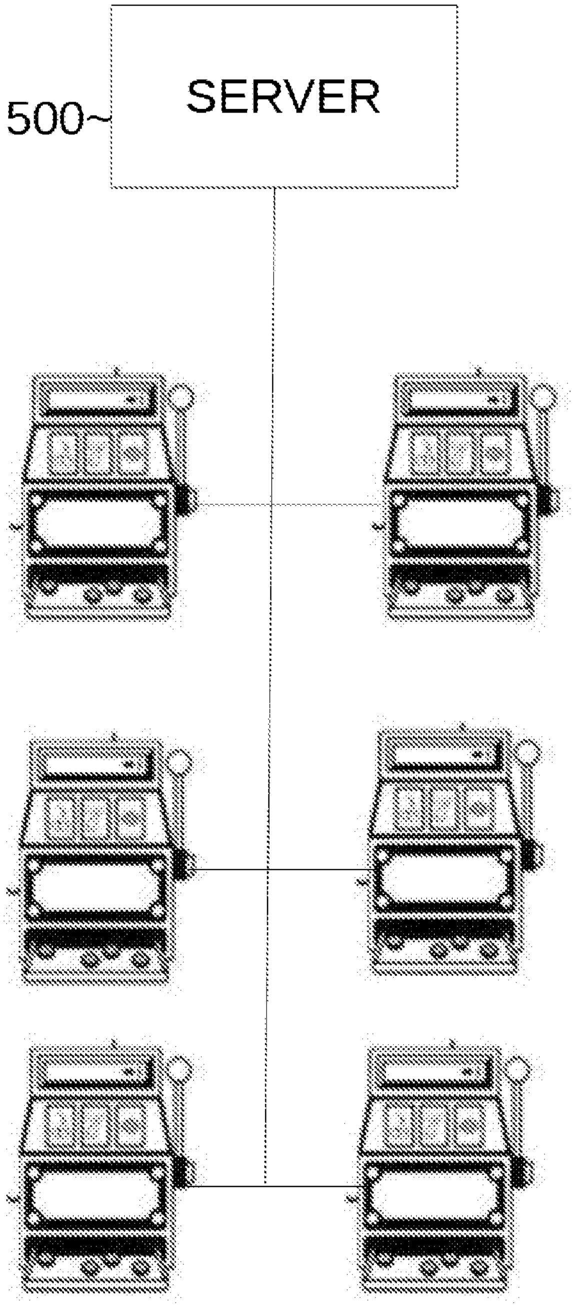
FIG. 5 is a drawing illustrating a plurality of networked electronic gaming machines, according to an embodiment.

FIG. 5 is a drawing illustrating a plurality of networked electronic gaming machines, according to an embodiment.

A server 500 also serves as a database a referred to herein which generates and stores all of the predetermined outcomes. The server 500 communicates with each of the plurality of gaming machines (slot machines) and can communicate with each on an individual basis. Thus, server 500 serves each result (outcome) for each spin to each individual gaming machine upon the request for that result by the individual gaming machine. In another embodiment, the server 500 can transmit a plurality of outcomes (up to all of the outcomes for the tournament) all at once to the gaming machines when then store the outcomes locally. In this manner there is no need for each gaming machine to receive the outcomes one by one as they can all be transmitted in a group.

The server 500 can have its own internal database to store the predetermined results (and any other data needed for the game) or it can connect to and communicate with an external database (not pictured). Server 500 contains a computer readable storage medium which is programmed to implement (cause) all of the methods/features described herein to be implemented on all of the gaming machines. Server 500 can also be server 600 when the game is player over the internet.

All of the gaming machines (six are pictured in FIG. 5 but it can be appreciated that there can be any number of gaming machines, such as 2-100 or more) can transmit any state or variable of the machine to the server. For example, the number of play credits, game credits, spin number, etc., can all be transmitted to the server 500. In this way, when the tournament is over, each gaming machine transmits their status to the server 500 so that the server 500 can determine which machines are the winners and how much each winner gets. All of the games/features herein can be implemented on the computers of all of the gaming machines.

Figure 6:
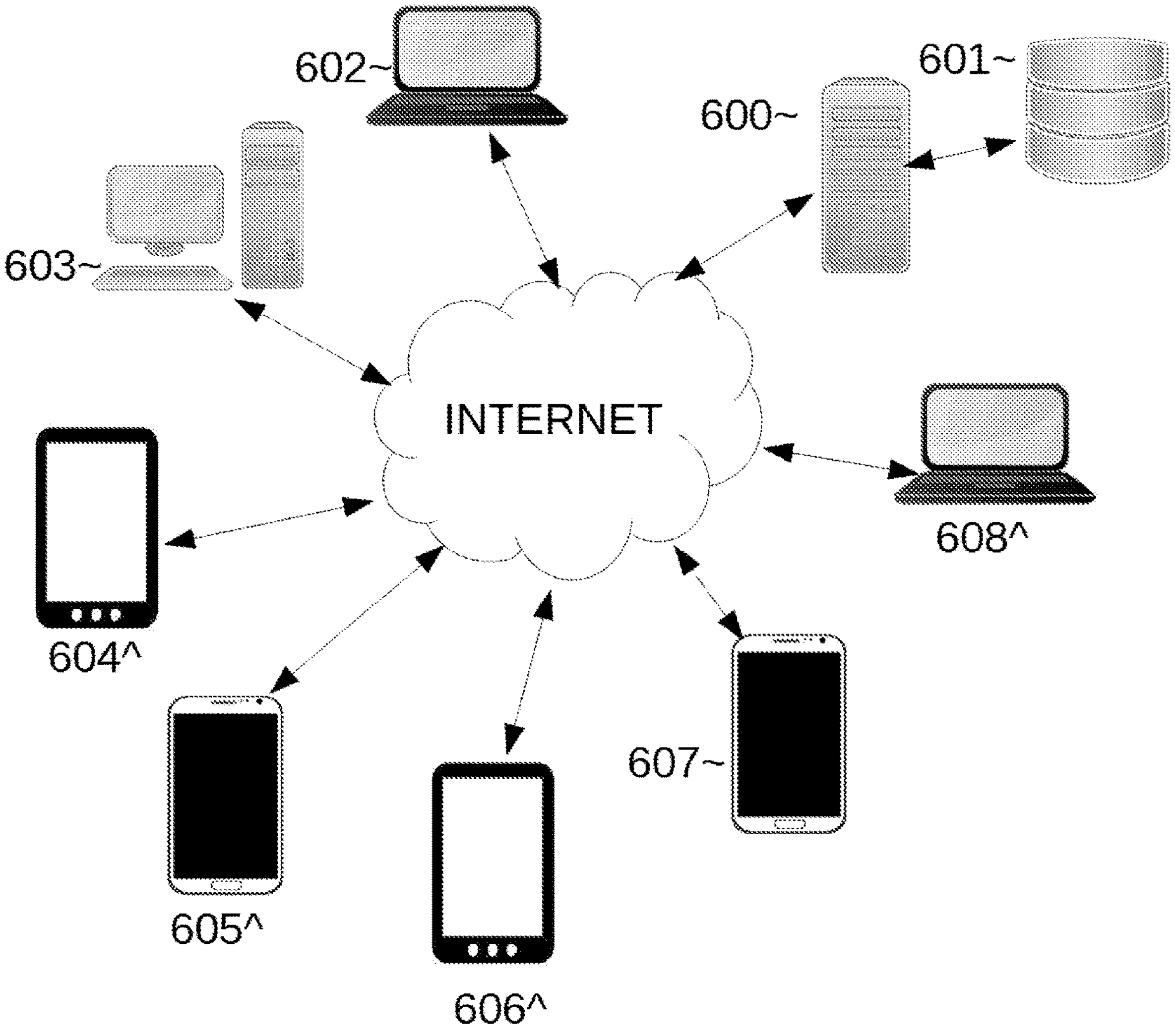
FIG. 6 is a block diagram of a network utilized to implement networking personal computing devices, according to an embodiment.

FIG. 6 is a block diagram of a network utilized to implement networking personal computing devices, according to an embodiment.

The tournament can be offered entirely online and players can use their personal computing devices (e.g., personal computer, laptop, tablets, cell phones, etc.) to connect to server 600 (which serves as server 500 and implements (causes) the entire tournament and games on all of the personal computing devices). Server 600 can store all data needed (including the predetermined outcomes) internally or any such data can be stored on an external database 601 which connects and communicates with server 600. Server 600 contains a computer readable storage medium which is programmed to implement (cause) all of the methods/features described herein to be implemented on the personal computing devices of the remote players.

Shown are seven remote players 602, 603, 604, 605, 606, 607, 608, which are in all different physical locations and connect to the server 600 via the internet. Each of the remote players can connect using a web browser and/or by installing and running an app on their personal computing device which is programmed to connect to the server 600 and implement all of the methods described herein.

A tournament can have any number of remote players (with a cap optionally set by the game designers). For example, each tournament can have a maximum cap of 100 players. In another embodiment, there is no cap (limit) on the number of remote players in each tournament. All of the games/features herein can be implemented on the computers of all of the remote players.

Figure 7:
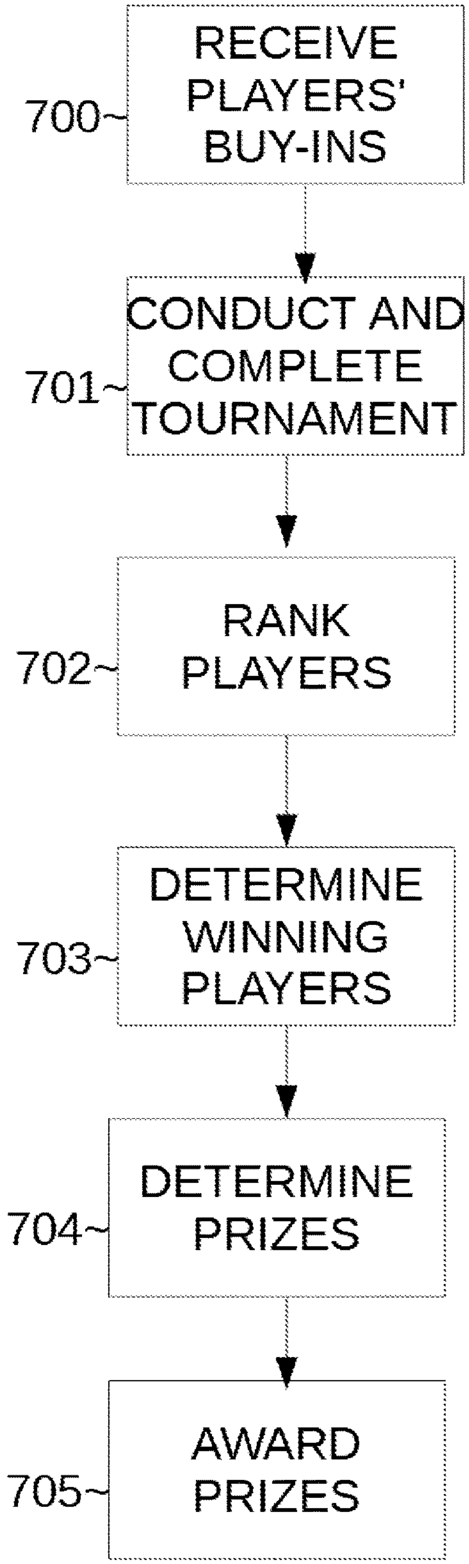
FIG. 7 is a flowchart illustrating how prizes are awarded in the tournament, according to an embodiment.

FIG. 7 is a flowchart illustrating how prizes are awarded in the tournament, according to an embodiment.

In operation, the players all pay their buy-ins in order to participate in the tournament. Each player pays a fixed amount (e.g., $2, $3, etc.) for a predetermined amount of credits (e.g., 10,000 good for 10,000 spins). Typically, the number of credits would be far in excess of what the player could possibly use within the allotted time limit (i.e., no matter how fast the player presses the spin button the player would not be able to spin more than the number of credits given).

The player can make their buy-ins in a number of ways. The player can insert cash into a bill validator on the gaming machine itself. The player can also pay an attendant the buy-in price who will enter the machine number into a tablet (or other computing device) which activates that machine into the tournament. In another embodiment, the player can use an app on their cell phone, wherein the player types in a machine number into the cell phone and makes payment using the cell phone (e.g., using a credit card or other electronic payment mechanism). The app (though a wireless connection on the cell phone) would then wirelessly transmit to the server 500 that the machine number has made payment into the tournament and hence that particular machine would be activated for the tournament.

All of the buy-ins are put into a pool. A percentage of this pool is taken out as the house commission and the remainder is divided among the winners of the tournament. In this way, the house (casino or other organization that is administering the tournament) will always make their fixed percentage regardless of the outcome of the tournament.

From operation 600, the method proceeds to operation 601, which initiates the tournament and enables all gaming machines that are activated (that paid the buy-in price) to play the game. Machines which are not activated will be dormant for the tournament and their spin button will not do anything. The tournament is conducted and completed when the allotted time has expired.

From operation 701, the method proceeds to operation 702, which ranks the players. All of the win credits on each of the machines are ranked in order from most to least. The most (highest) win credits is best. The rank of all players can be displayed on the leaderboard.

From operation 702, the method proceeds to operation 703, which determines the winning players. There will be predefined rules which will dictate a number of players which will be winners and what percentage of the pool they will receive. For example, in a tournament with 20 maximum players, the best 4 players (the highest 4 win credits) will be the winners.

From operation 703, the method proceeds to operation 703, which determines the prizes for the winners. For example, a table such as Table II can be used to determine the prizes for the winners. Note that the embodiment A distribution in Table II will award 100% of the pool. In this embodiment, the house commission will be taken out before the pool amount is divided up. In another embodiment, the entire pool will not be distributed to the winners and the house will keep the remainder. For example, see Table II, embodiment B, which awards 90% of the pool to the players and the remaining 10% is kept by the house (or other administer of the tournament) as profit.

TABLE II

| Rank | % of pool (emb A) | % of pool (emb B) |
|---|---|---|
| 1 | 40 | 40 |
| 2 | 35 | 30 |
| 3 | 20 | 15 |
| 4 | 5 | 5 |

To determine the actual prizes awarded, the respective percentage of the pool is applied to the total pool amount. For example, in Table II, embodiment B, if the pool is worth $100, then highest ranking player (player with the highest number of win credits) would win $40, while the fourth ranking player would win $5. The players ranked lower than four would not win anything and hence would be losers. Note that the numbers in Table III are merely exemplary and other distributions can be used as well. In addition, there can be any number of winners such as (1-10 or more), but of course there should be at least one loser.

From operation 704, the operation proceeds to operation 705 which awards the prizes. Once all of the prize amounts have been determined, then each winning player will be awarded his/her prize. This can be done in numerous ways. For example, an attendant can physical pay each winning player cash. Alternatively, if the player is using an app, the prize amount can be electronically transferred to the player's bank account or other electronic payment mechanism. In another embodiment, the machine each winning player is sitting will print (using a ticket printer) a voucher which is redeemable for the respective prize amount. The voucher can then be redeemed for cash at a cashier or at a ticket redemption machine (a machine in which the ticket can be inserted and cash would automatically be dispensed to the player).

There are numerous paradigms which players can enter the tournaments and receiving their winnings. Players can play at a physical location where they physically sit down at a real slot machine and play in a slot tournament area in which entire bank(s) of machines are dedicated for the purpose of a tournament. Players can also play on their personal computing devices (e.g., cell phones, desktop computer, laptop computer, tablet, etc.) and can play from anywhere as long as their personal computing device is connected to the internet.

Players can also either play on a cash basis for player for non-cash redeemable points. When playing on a cash basis, the tournament entry fee is paid in cash and any winnings players win are also paid out in cash. When playing on a points basis, players still pay cash to enter the tournament but winners are paid in points. Players with the most points might win non-cash prizes.

Figure 8:
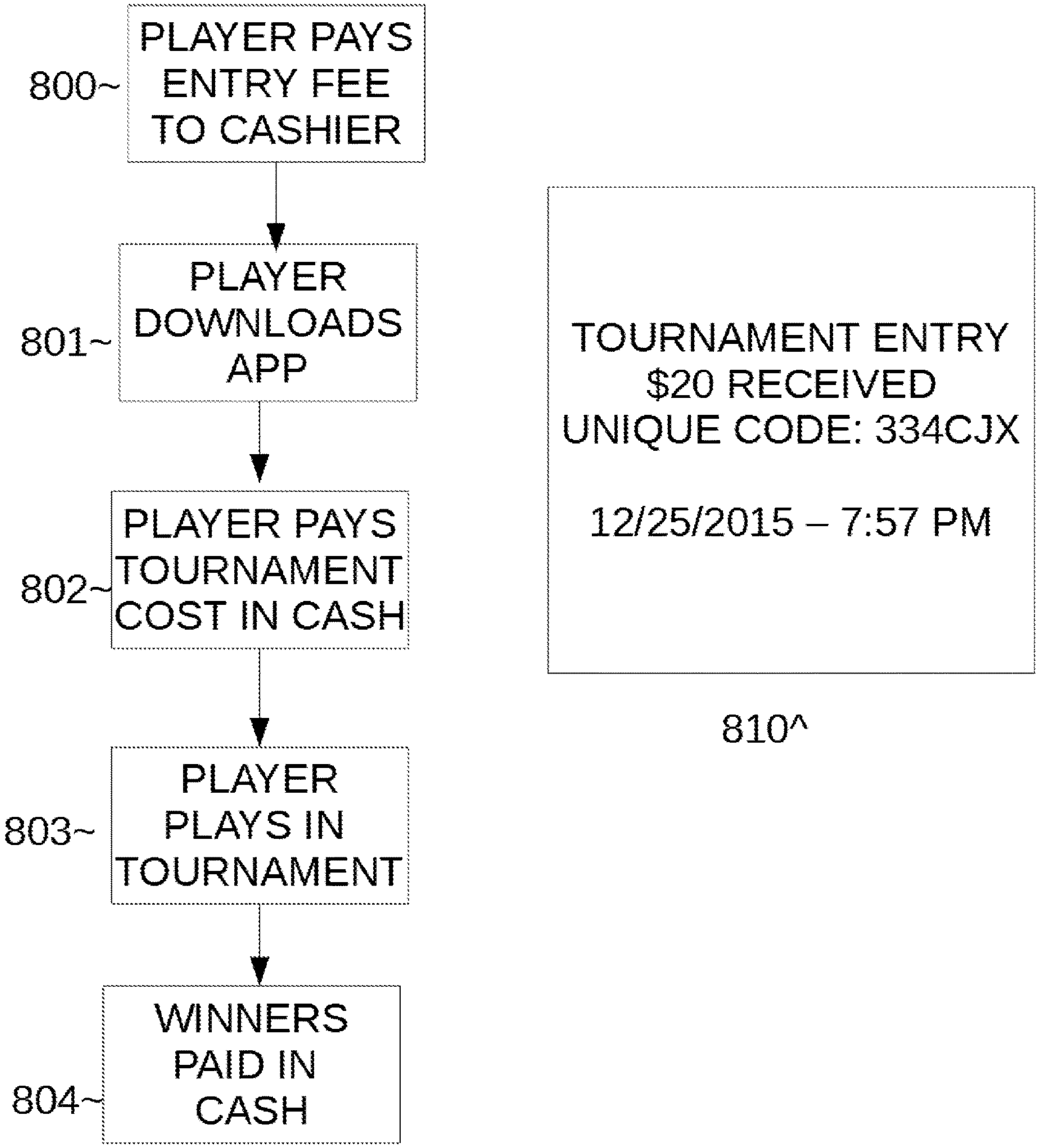
FIG. 8 is a flowchart illustrating an exemplary method of players entering a tournament using an app and playing for cash, according to an embodiment.

FIG. 8 is a flowchart illustrating an exemplary method of players entering a tournament using an app and playing for cash, according to an embodiment.

In operation 800, the player pays an entry fee to the cashier. The location can be any commercial location, such as a bar, restaurant, casino, movie theater, etc. The customer pays the entry fee (e.g., $20 cash or any other predetermined fixed amount) to a cashier on the premises. The cashier would receive the entry fee cash and press a button on a terminal (which is a computer) and generates an entry slip which is printed by a printer. The entry slip will have a unique identification number (or code) on it.

A slip 810 is printed at a ticket printer at the cashier evidencing the player's payment of the entry fee to the tournament. The slip 810 shows the unique (and random) code that the player type into his/her personal computing device in operation 801. A record at the server is created which is associated with the unique code so that when an app is registered (in operation 801) and this unique code is entered into the app, then server can confirm payment by this particular player.

From operation 800, the method proceeds to operation 801, wherein the player can then download an app (a particular app distributed by the provider of the tournament and programmed to enable the methods/features described herein) from an app store (e.g., ITUNES, GOOGLE PLAY STORE, etc.) on the player's personal computing device (if the player doesn't already have the app). The player will register (if the player is not already registered) for an account. To register the player would enter in his/her real name, nickname for the game, email address, and any other personal information that can be used. The player will have to type in the unique code present on the slip 810 the player received when the player paid the entry fee at the cashier. This unique code is verified by the server and once verified the player is confirmed that he/she paid the entry fee and the fee paid at the cashier is credited to the player/s account.

From operation 801, the method proceeds to operation 802, wherein the player pays the entry fee for the tournament in cash out of the player's account. The entry fee will be deducted from the player's account. Each player's account will store how much cash is held in that particular account, From operation 802, the method proceeds to operation 803, the player is now registered for the tournament. When the tournament begins, the player will play in the tournament and compete against other players in the tournament. Typically, all of the players in the tournament are in the same physical location as the player although in another embodiment this is not required. The tournament is played on the user's personal computing device (which substitutes for the gaming machine).

From operation 803, the method proceeds to operation 804 once the tournament has ended, wherein the winners and respective prizes are determined and paid cash. The player's account will be credited with their cash prizes that they have won. They can collect this prize in numerous ways. The player can go to the cashier and present identification and the cashier can pay the player a cash amount representing the value of the player's account (and then the account is then reset to zero in the database reflecting that the player has already been paid). The player can also have the winnings transferred to the player's bank account electronically. The player can also go to a kiosk and enter his/her unique code, other code provided by the app, and cash representing the player's winning (prize) can be dispensed automatically by the kiosk to the player. Whenever the player is paid his/her winnings, then of course the player's record in the server is updated that the player has been paid (and how much) so that the player cannot be paid his/her winnings more than once.

Thus, the method illustrated in FIG. 8 enabled a player to pay cash to enter the tournament and win cash. In another embodiment, instead of the player paying cash to a cashier, the player can pay the entry fee via a credit card or other electronic payment method on his/her personal computing device thereby obviating the need for the player to be physically present at a particular location to play for real cash.

Figure 9:
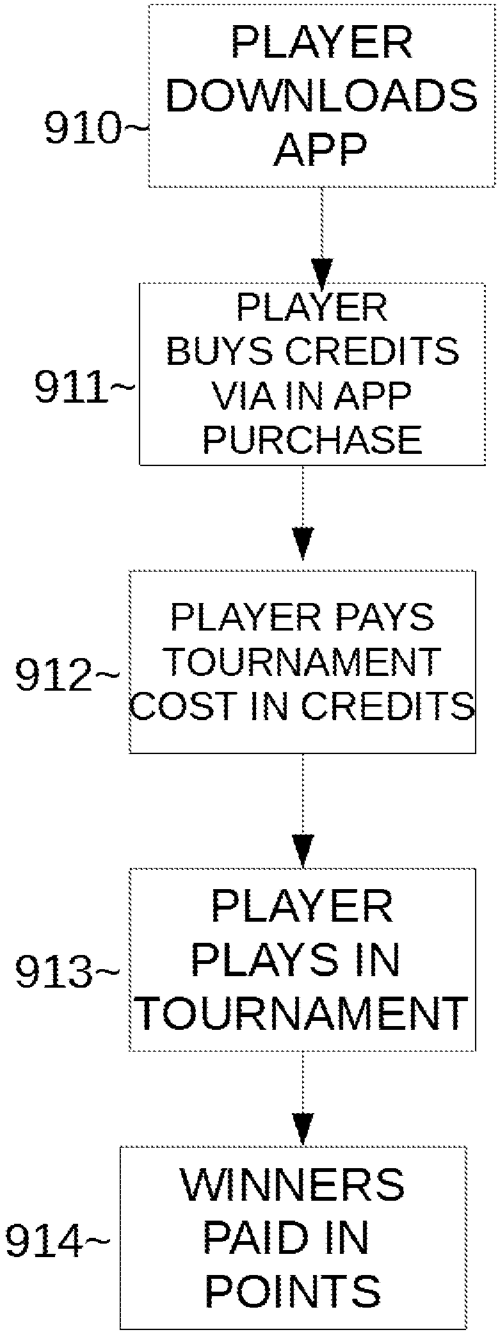
FIG. 9 is a flowchart illustrating an exemplary method of players entering a tournament using an app and playing for points, according to an embodiment.

FIG. 9 is a flowchart illustrating an exemplary method of players entering a tournament using an app and playing for points, according to an embodiment.

In operation 910, the player downloads the app (as in operation 801).

From operation 910, the method proceeds to operation 911, wherein the player buys account credits by making an in-app purchase. An in-app purchase is where the player can press a button (or other interface mechanism) inside an app that is running in order to purchase something for real money and the charge is made to the user's credit card on file at the respective app-store (e.g., ITUNES, GOOGLE PLAY STORE). Note that account credits are different than play credits and win credits. Account credits are credits that are tracked in each account. Each account for each player stores a value of account credits held by that account. Account credits are not redeemable for cash but can be used to play tournaments. When the player wins a tournament, the winnings are also paid in account credits.

From operation 912, the method proceeds to operation 912 wherein the player enters the tournament by paying the fee to enter the tournament in account credits which are deducted from the player's account.

From operation 912, the method proceeds to operation 913 in which the player then plays in the tournament (once it begins) as described herein. The tournament is played on the user's personal computing device (which substitutes for the gaming machine).

From operation 913, the method proceeds to operation 914, wherein the winners are paid their respective prizes in points but not cash. The points cannot be redeemed for cash but can (in an embodiment) be used to exchange for non-cash items. The winners can be places on a long-term leaderboard. The long-term leaderboard can maintain and display the players with the highest scores (amount of win credits) indefinitely. So for example, the top ten highest scores can be displayed and these players can have "bragging rights" while their names remain on the long-term leaderboard. The long-term leaderboard can be displayed on the app, on a web site, etc.

Figure 10:
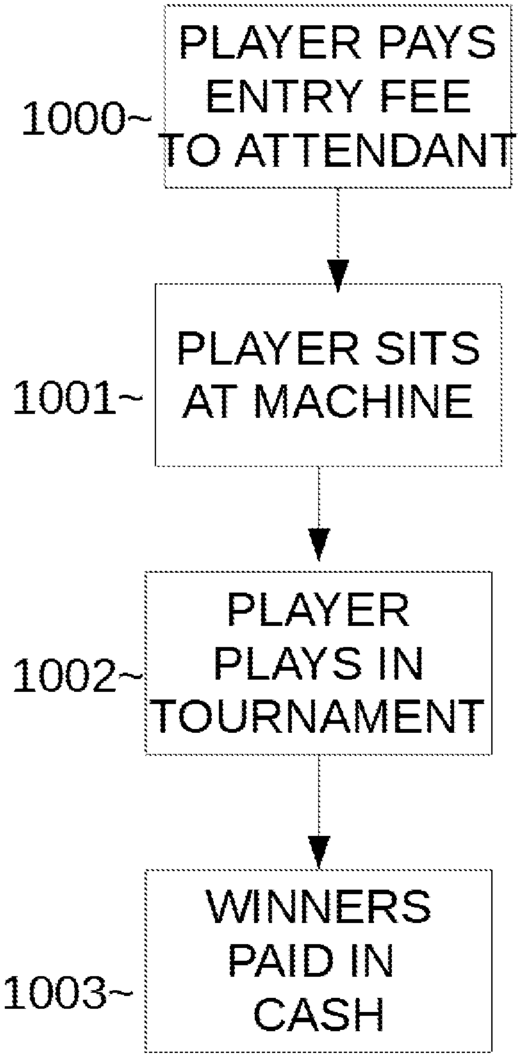
FIG. 10 is a flowchart illustrating an exemplary method of players entering a tournament at a physical slot tournament and playing for cash, according to an embodiment.

FIG. 10 is a flowchart illustrating an exemplary method of players entering a tournament at a physical slot tournament and playing for cash, according to an embodiment. In this embodiment, the players must be physically present and there is a physical area set aside for the gaming machines that are used for the tournament. Typically these gaming machines cannot be used for standard slot machine play while the tournament is taking place and can only be used as part of the tournament.

In operation 1000, the player pays a cash entry fee to an attendant at the tournament. The entry fee is typically fixed (e.g., $20). In another embodiment, the player can pay the entry fee to a cashier at the location and the cashier will then provide the player with a slip which evidences that the player has paid the entry fee. The player would then show this slip to the attendant to confirm that the player has already paid at the cashier.

From operation 1000, the method proceeds to operation 1001, wherein the attendant then seats the player down at a particular gaming machine in the tournament area. Each gaming machine has a unique number printed on it used to identify each gaming machine (and hence its player).

From operation 1001, the method proceeds to operation 1002, wherein the player plays at the tournament as described herein. While there would be a finite number of gaming machines in the tournament area (e.g., 20), while optimally all of these machines are utilized for the tournament nevertheless all machines are not required to be used and hence some can be vacant during the tournament.

From operation 1002, the method proceeds to operation 1003, wherein after the tournament is completed the winners and their prizes are determined (as described herein). Then the winners are paid their prizes in cash (by the attendant or other personnel).

FIG. 11 is a drawing of an exemplary leaderboard displayed to all of the players, according to an embodiment.

The leaderboard is displayed to all players once the tournament ends. In the case of a physical tournament with physical slot machines, then the leaderboard can be displayed on a large LCD in view of all of the players. If the tournament is played online using personal computing devices (e.g., using cell phones, tablets, etc.) then the leaderboard would be displayed on the personal computing device. The leaderboard can optionally be displayed during the tournament as well and would be updated in real time. In this way, each player would know how they stand in the tournament.

The leaderboard identifies each machine by its number (each physical machine will have a number printed on it), the current number of win credits that machine has (after the tournament is over this is the final number of win credits for each machine) and the prize that each machine has won.

Before the tournament is completed, if the leaderboard is displayed the prize column will not be displayed because it is now know yet what each machine (or player) has won.

In the online version (played via personal computing devices), then instead of the machine #identifying each machine, each player can be identified by a username, email address, account number, or some other identifier.

As the player spins the slot machine game the player will earn win credits whenever the symbols displayed on the outcome of the spin have a winning combination. The player will also earn win another way. In addition to the slot game (the "main game"), there will also be a side game that the player can play (typically simultaneously or contemporaneously as the main game is being played). The player earns additional win credits by playing the side game as well and the win credits earned from the slot game (the main game) and the side game are all combined into one quantity (displayed to the player as the win credits on the machine).

Figure 12:
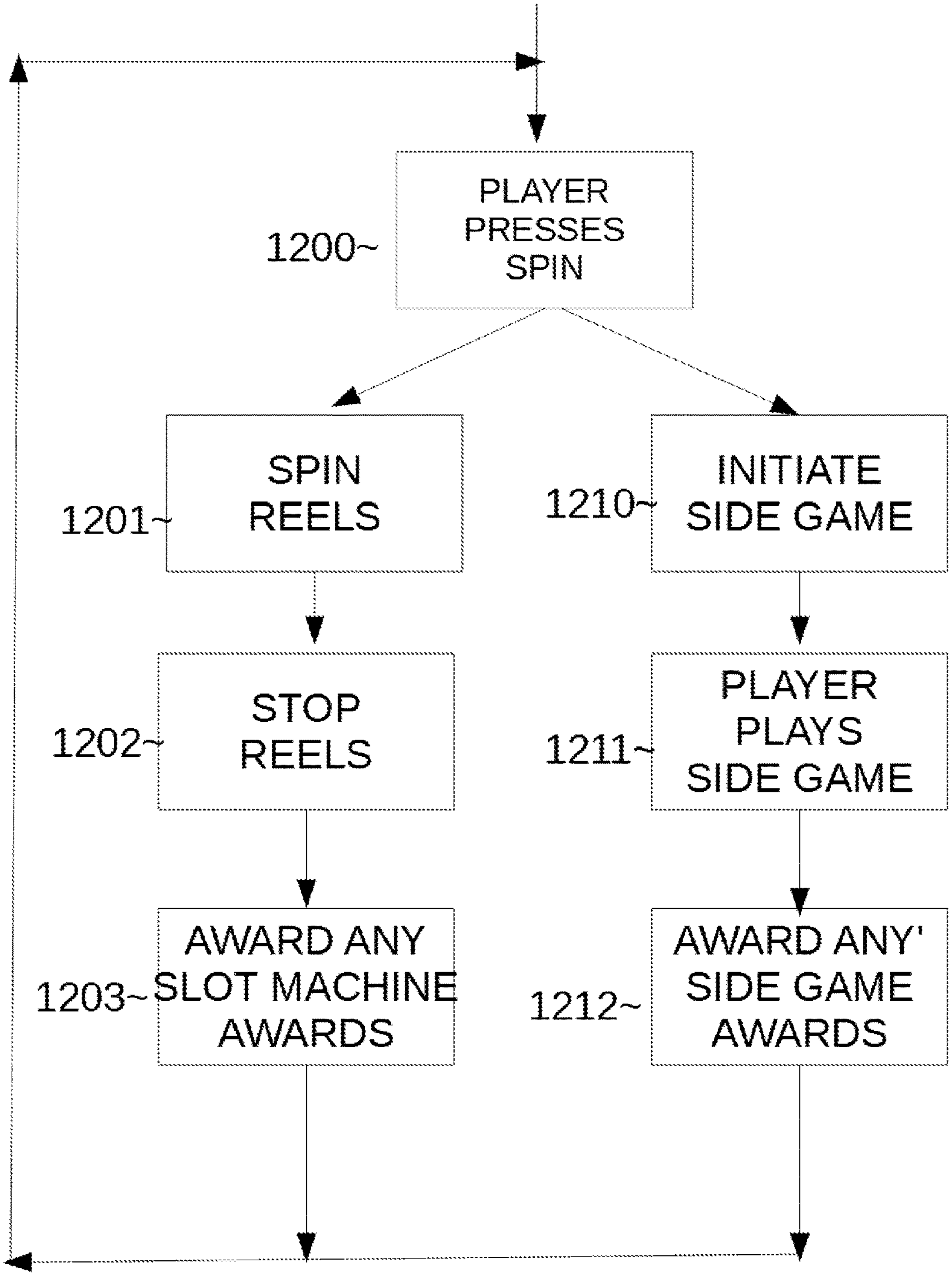
FIG. 12 is a flowchart illustrating the play of a slot game and a side game simultaneously or contemporaneously, according to an embodiment.

FIG. 12 is a flowchart illustrating the play of a slot game and a side game simultaneously or contemporaneously, according to an embodiment.

In operation 1200, the player presses the spin button. This will deduct one or more play credits. This initiates the slot game and also initiates the side game. Neither the slot game nor the side game will initiate unless the spin button is pressed. Thus, pressing the spin button will cause both operations 1201 and 1210 to execute.

In operation 1201, the slot machine reels spin. Typically, the spin button will not be active (i.e. would not have any function when pressed) while the reels are spinning and would only function once the reels have stopped spinning and the method has returned to operation 1200.

From operation 1201, the method proceeds to operation 1202, wherein the reels will stop at the predetermined locations (as described herein) to a combination.

From operation 1202, the method proceeds to operation 1203, which awards the player (machine) all earned awards (if any) on the combination.

Note that in one embodiment, from operation 1203, the method returns to operation 1200 which enables the player to immediately spin again. In another embodiment, the side game (operations 1210-1212) must be completed before in operation 1200 the player is able to press spin (and initiate another spin again).

When operation 1200 occurs (and the spin button is pressed), in addition to proceeding to operation 1201 (which plays the slot game), the method also proceeds contemporaneously to operation 1210 which initiates a side game. This entails initiating any animations that begin the side game.

From operation 1210, the method proceeds to operation 1211, wherein the player plays the side game. The player uses an input device (e.g., touch-screen, mouse, pointer, keyboard, buttons, etc.) on his/her slot machine or personal computing device to control the side game.

From operation 1211, the method proceeds to operation 1212, after the player has played (or is still currently playing) the side game, any awards earned by the player during the side game will be awarded to the player. This means that any side game awards are added to the player's win credits. From operation 1212, the method proceeds to operation 1000.

Note that any conditions in the side games should be identical for all players playing in the same tournament. For example, if the spin button were to release a random number of balloons, then each player in the tournament would receive the same random number of balloons for that particular spin (e.g., on the $10^{th}$ spin there would be released 5 balloons while on the $11^{th}$ spin there would be released 4 balloons). Each of the balloons released (for each particular spin) would also have the same speed, trajectory, and any other characteristic as well for all of the players in the tournament. This is to remove elements of luck so that each player's skill will determine their ultimate score (the amount of win credits). Thus, all players in the tournament will be presented with the same outcomes and situations (in both the slot game and the side game) so it cannot be said that one player received a "luckier" game than the other.

It may be possible for the side game to last longer than the spinning reels in the slot machine. This can be addressed in numerous ways. In one embodiment, operation 1200 will not be returned to until the side game is completed (which may or may not require input from the player) and hence the player cannot spin the reels again until the current activation of the side game has been completed. In another embodiment, when the spinning (operation 1201) has stopped (operation 1202) and the method returns to operation 1200 then the spin button would immediately function again (in operation 1200) and the player could immediately spin again. In this embodiment, any side game currently in progress would be handled in at least one of the following two ways: a) the side game can be terminated, or b) the side game remains in progress and is unaffected that the reels have spun again.

Figure 13:
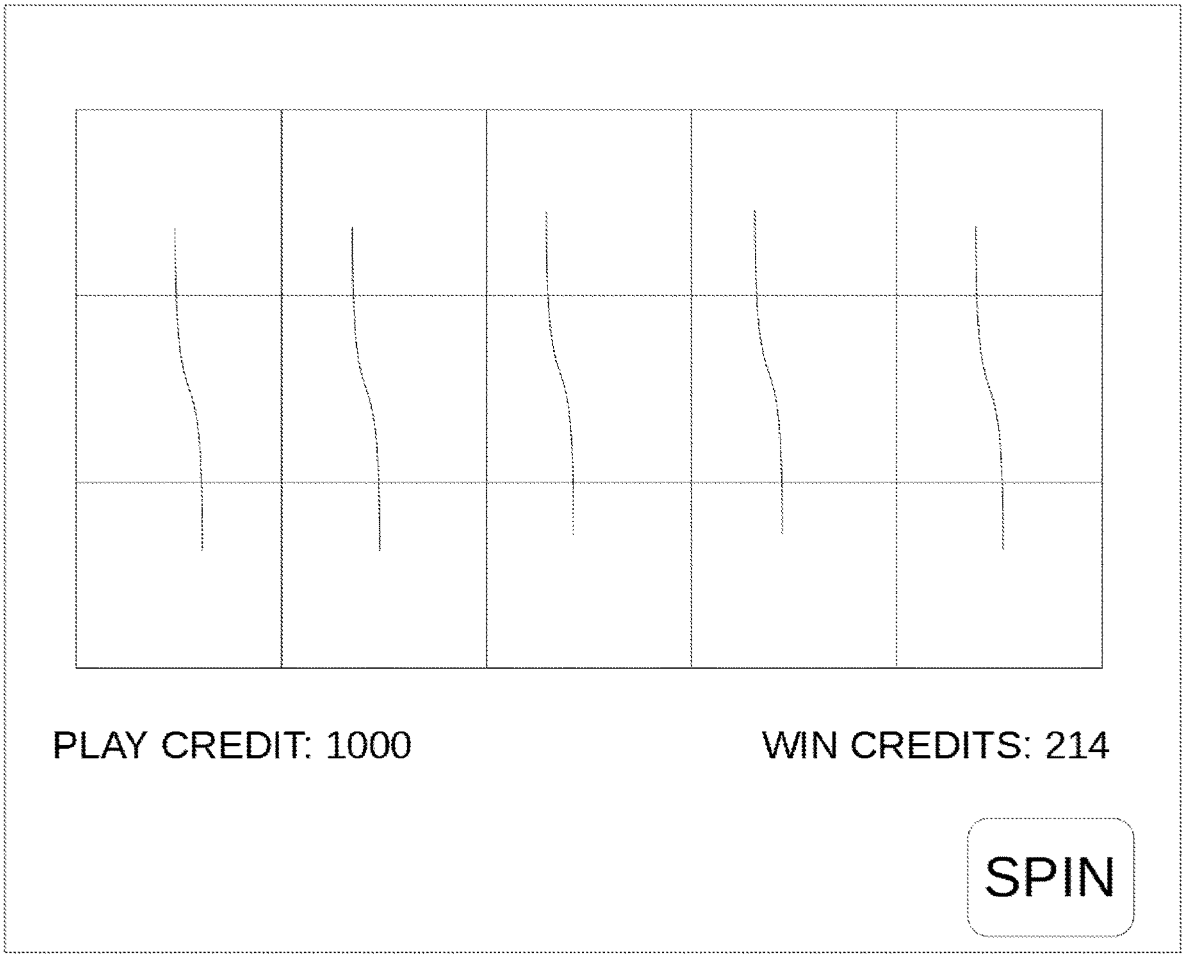
FIG. 13 is a drawing illustrating a slot machine game during a spin of the reels, according to an embodiment.

FIG. 13 is a drawing illustrating a slot machine game during a spin of the reels, according to an embodiment.

All of the reels are shown with animated spinning reels. The reels will then stop one by one (typically from left to right) to their final position for the spin. Pressing the spin button while the reels are spinning typically will not have any function.

Figure 14:
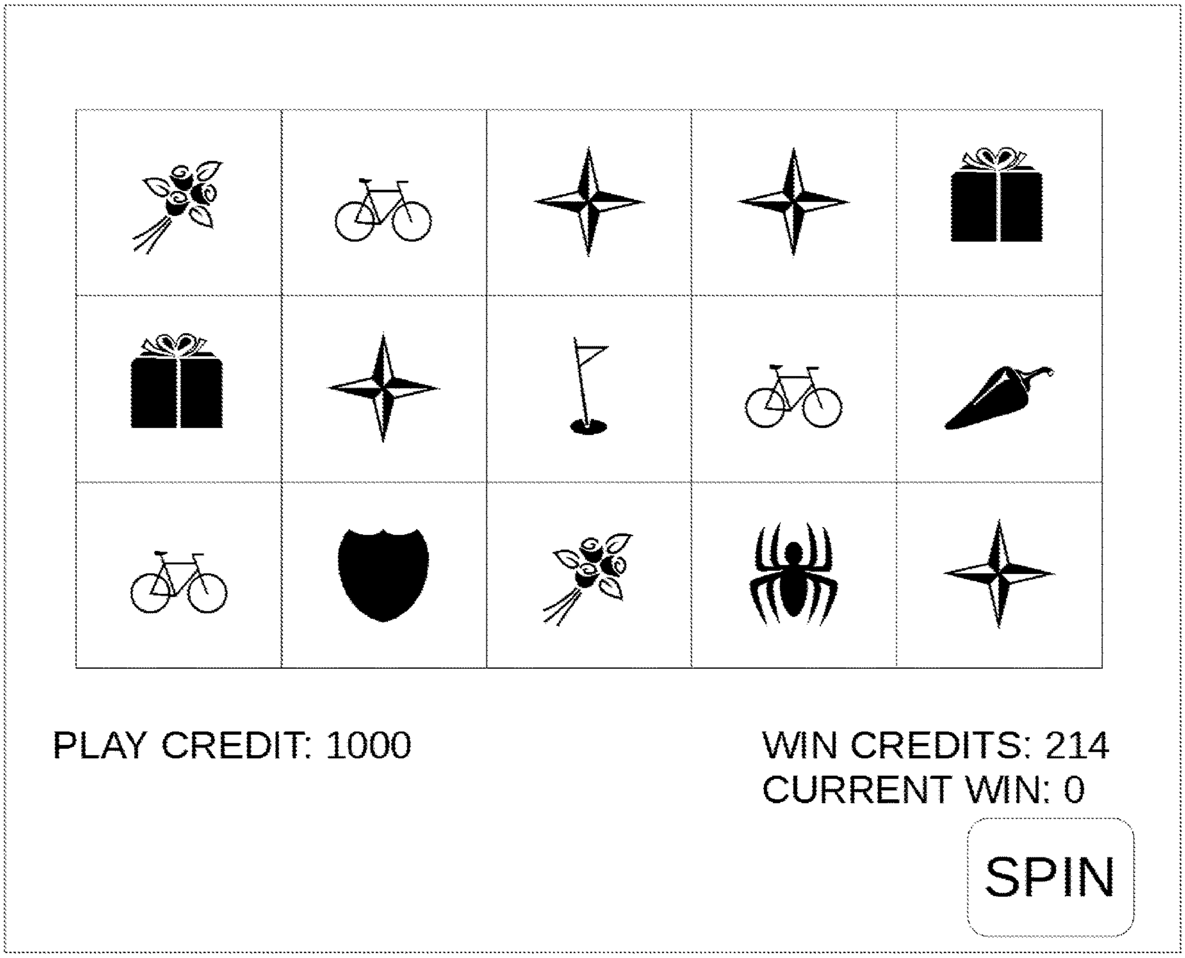
FIG. 14 is a drawing illustrating a slot machine game after a spin, according to an embodiment.

FIG. 14 is a drawing illustrating a slot machine game after a spin, according to an embodiment.

Once the reels stop spinning, the slot machine shows symbols in all of the positions on the grid. Now that the reels are stopped, the "spin" button would spin now function to spin the reels again. Note that in an embodiment, the side game may have to be played and completed before the reels will spin again, although in another embodiment the reels can always be spun after they stop spinning whether or not the side game is in progress or not.

Figure 15:
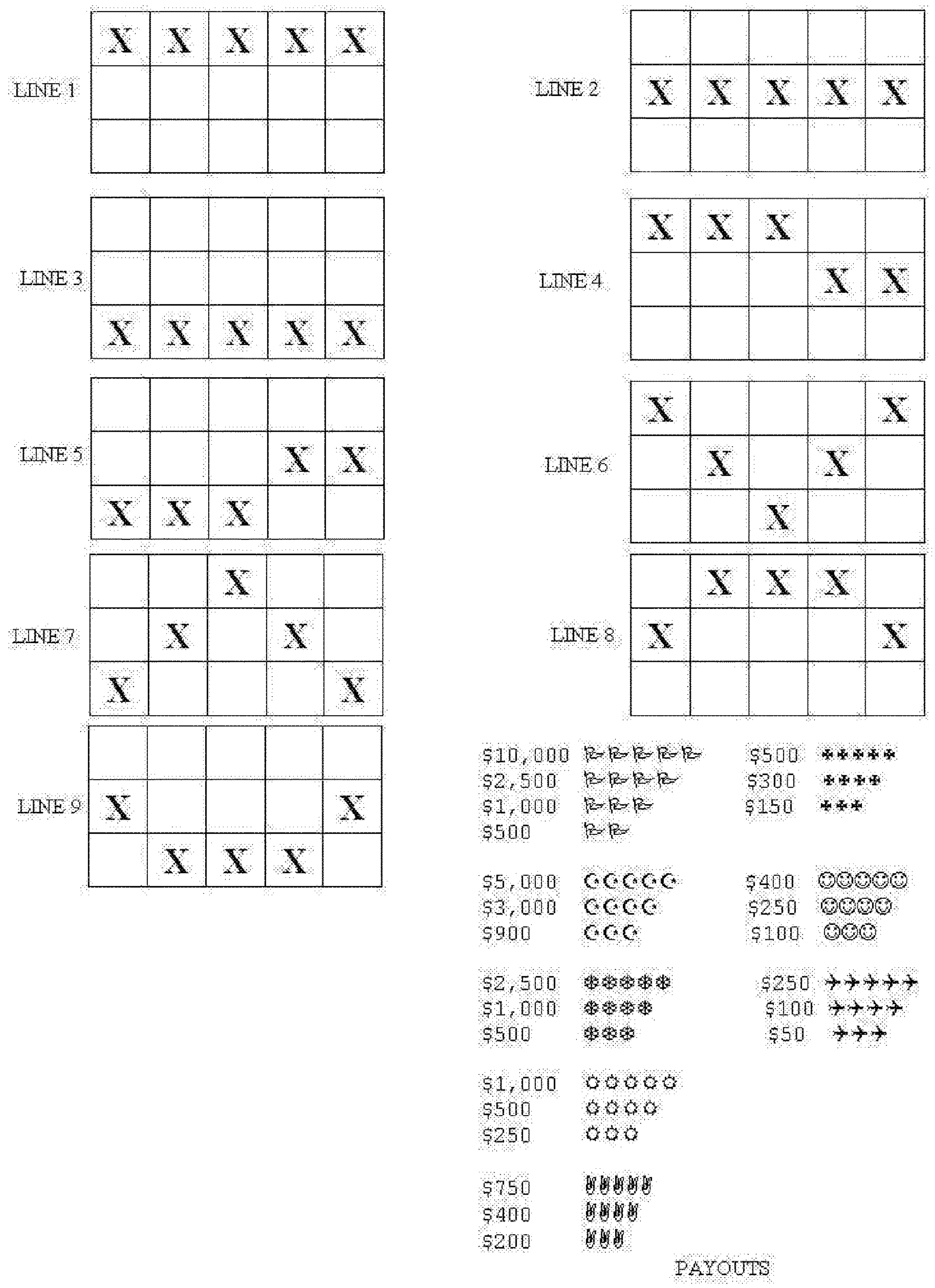
FIG. 15 is a drawing illustrating slot machine game paylines, according to an embodiment.

FIG. 15 is a drawing illustrating slot machine game paylines, according to an embodiment.

Note that when the symbols stop spinning, there are discrete paylines of which the respective symbols are combined to compare to the paytable. In one embodiment, all possible paylines are live, meaning 3^5=243 paylines (this is all possible combinations of symbols using one symbol in each column from left to right). In another embodiment, there are a smaller number of predefined paylines. For example, FIG. 13 shows a game with only nine paylines with the 'X' symbol designated which particular location in the grid is used for each payline. Typically, all paylines are automatically active (able to win awards for combinations appearing therein) for every spin.

Also shown in FIG. 15 is an exemplary paytable which shows winning combinations and the amount of win credits that would be awarded for each such winning combination. Each payline is checked for such winning combinations, and so more than one payline can have a winning combination (each and every winning combination on each payline is awarded). Note that all combinations not shown in the paytable are losers (do not pay any award).

There are numerous side games that can be offered. Any side game can be offered that utilizes some player skill (mechanical, intellectual, or both). The player would take actions in the side game using an input device (e.g., touch-screen, joystick, keyboard, buttons, point device, etc.) The side game will have an outcome based on the player input and optionally random determinations as well. Based on the outcome of the side game, the player can win (or possibly lose) win credits. The side game can having moving or stationary objects which the player should manipulate (e.g., touch, move, etc.) which are used to determine the outcome. Each side game would have a goal which when completed would earn the player additional win credits. Side games can optionally have a penalty in which for bad performance (or doing a prohibited act) the player would be panelized and lose win points.

Figure 16:
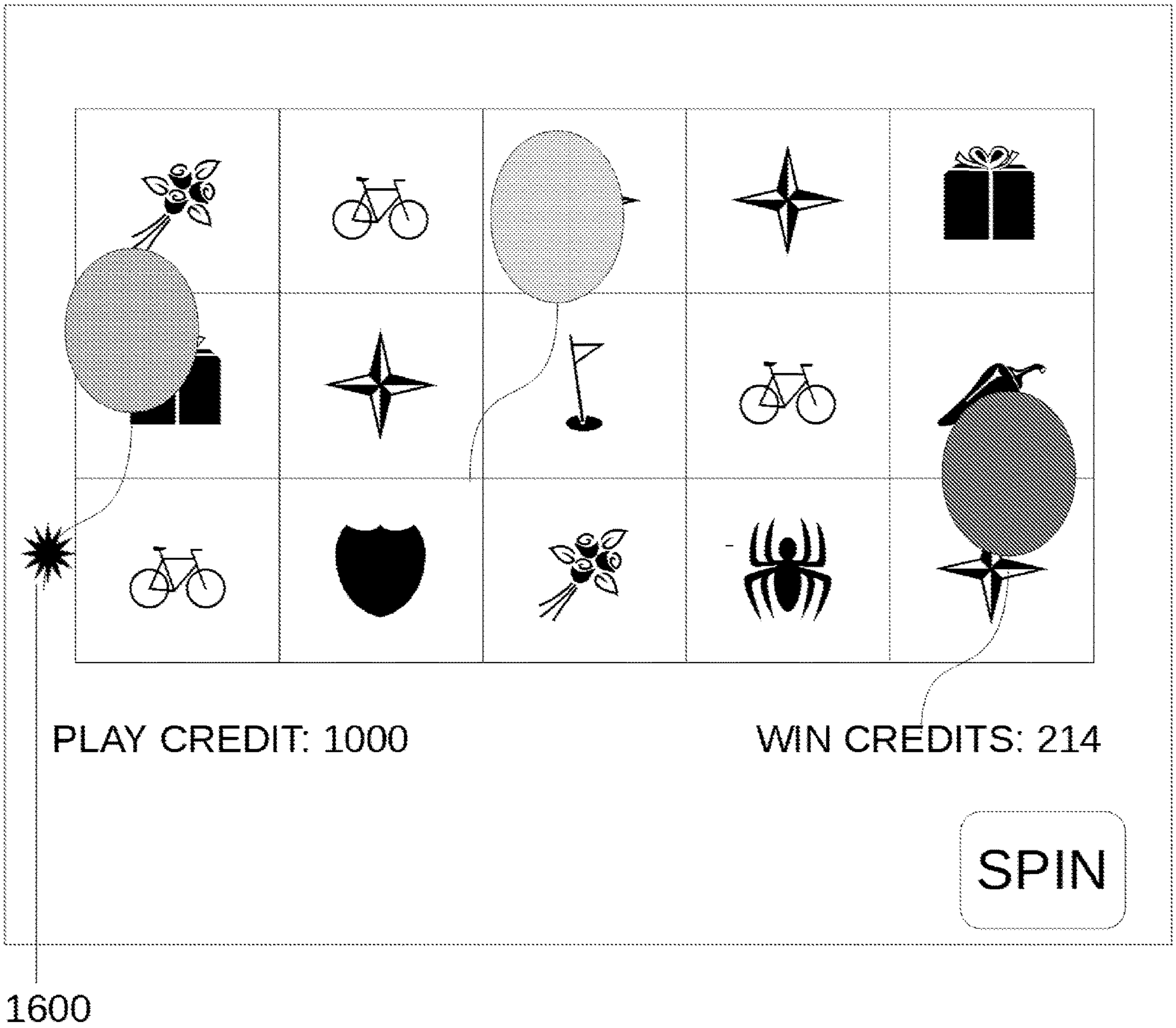
FIG. 16 is a drawing illustrating a slot machine game and a simultaneous balloon popping side game, according to an embodiment.

FIG. 16 is a drawing illustrating a slot machine game and a simultaneous balloon popping side game, according to an embodiment. A side game known as a "balloon pop" game will be described. Note that this is one possible side game of many possible kinds.

In this side game, once the spin button is pressed, then random balloons will fly (using computer animation) around the screen. The player's goal is to pop the balloons. More particularly, the player can "pop" the balloons by touching them on a touch-screen or by using a pointing control device (e.g., mouse), keyboard, or other such device to "pop" the balloons (e.g., using a mouse the player can point the cursor to a balloon and then press one of the mouse buttons). Points are given for popping each balloon. For example, each balloon popped would earn 100 win credits. The balloons will fly around the screen quickly and the player may not be able to pop all of them before they fly away, thus introducing an element of skill into the game.

In a further optional embodiment, a special icon (such as a rocket) will randomly fly around the screen during a side game being implemented. By touching (clicking) the special icon before it leaves the screen it simply awards a predetermined amount of points (win credits) to the player. In another embodiment, successfully touching (clicking) the rocket will put the player on the very top of the leaderboard. It would do this by taking the highest score (player with the highest number of win credits) and then assign the player who touches the rocket the highest number of win credits plus 100 (or other amount) of win credits (discarding however many win credits this player had before touching the rocket). So in other words, if the player at the top of the leaderboard has 5,430 win credits and a particular player has 2,000 win credits who then touches the rocket, the particular player will then have 5,530 win credits and now be at the top of the leaderboard.

Note that all awards in the side game are paid in win credits and are added to the player's win credit meter (see FIG. 1600, "WIN CREDITS: 214" is the win credit meter) which display's the player's/machine's current number of win credits. All awards from the slot game (e.g., payouts for winning combinations on paylines) are also paid in win credits. Win credits are a separate quantity from play credits which are displayed in the play credit meter (see FIG. 16, "PLAY CREDITS: 1000" is the play credit meter). The play credit meter is deducted by one (or other quantity) for each spin of the reels (although typically activation of the side game is tied to the spin button so the deduction of one play credit for pressing the spin button also activates the side game).

Figure 17:
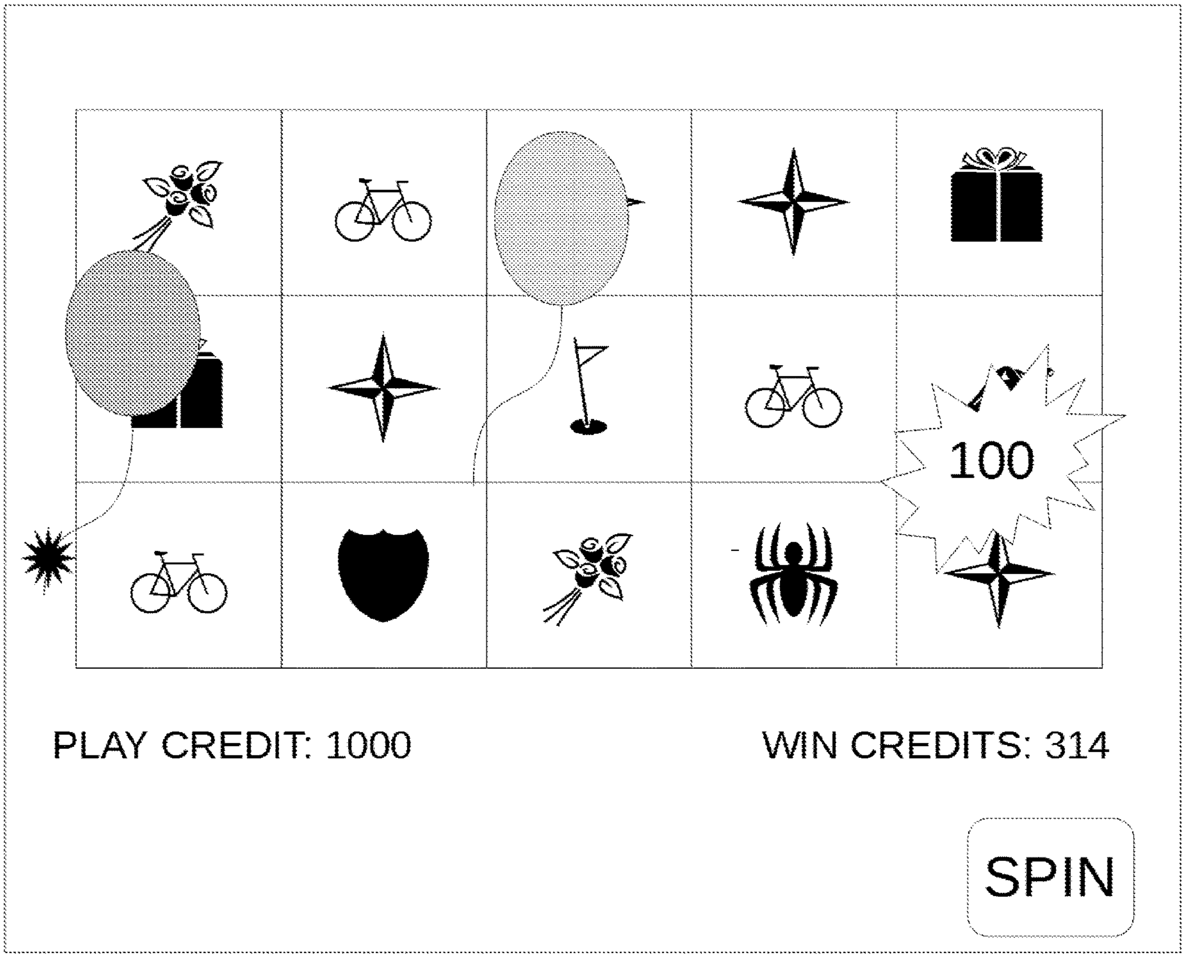
FIG. 17 is a drawing illustrating a balloon popping in the balloon popping side game, according to an embodiment.

FIG. 17 is a drawing illustrating a balloon popping in the balloon popping side game, according to an embodiment.

The rightmost balloon was popped by the player and hence the player is awarded 100 win credits.

Each time the spin button is pressed, a set of balloons (e.g., four or any other number) are released to which the player can then pop them before the float away. Balloons will eventually float off the screen and then cannot be popped. The balloons will float (and can be popped) while the reels are spinning (and while the reels have stopped). In one embodiment, the spin button will not be active again until all balloons on the screen have been popped or have floated away. In another embodiment, the spin button will always be active and will just release more balloons in addition to the ones that are currently floating on the screen.

Note the balloon pop side game can have numerous optional embodiments. In one such embodiment some of the balloons will have a special marking such as a lit fuse 1600. Balloons with a lit fuse (wick) should not be popped because by popping these will cost the player a penalty (e.g., the player will lose 300 win credits). Thus, no balloon with a burning wick should be popped.

In a further embodiment of the balloon pop game, the balloons can change colors over time. For example, the balloons would turn from green to yellow to red and then back to green again, with this cycle repeating (e.g., each color may last for only one second or any other duration of time). The goal is for the player to pop the balloons when they are green. Popping a green balloon would award 300 win credits, popping a yellow balloon would award 100 win credits and popping a red balloon would deduct 100 win credits. Note that these point values can be set to any other values as well. Note that all balloons with a burning wick will cost the player the same penalty (e.g., loss of 300 win credits) regardless of the color of the balloon. Only balloons that do not have a burning wick should be popped.

The faster the player presses the spin button, the more side games the player can complete in the allotted tournament time since the spin button also initiates (drives) the side game. In the embodiment where the spin button is not activate (cannot be pressed) until the side game is completed, then the faster the player completes the side game the more spins (and hence more side games) that can be played in the allotted tournament time. Thus the more skilled players will be able to play the game (press the spin button and complete the side game) faster than unskilled players.

Figure 18:
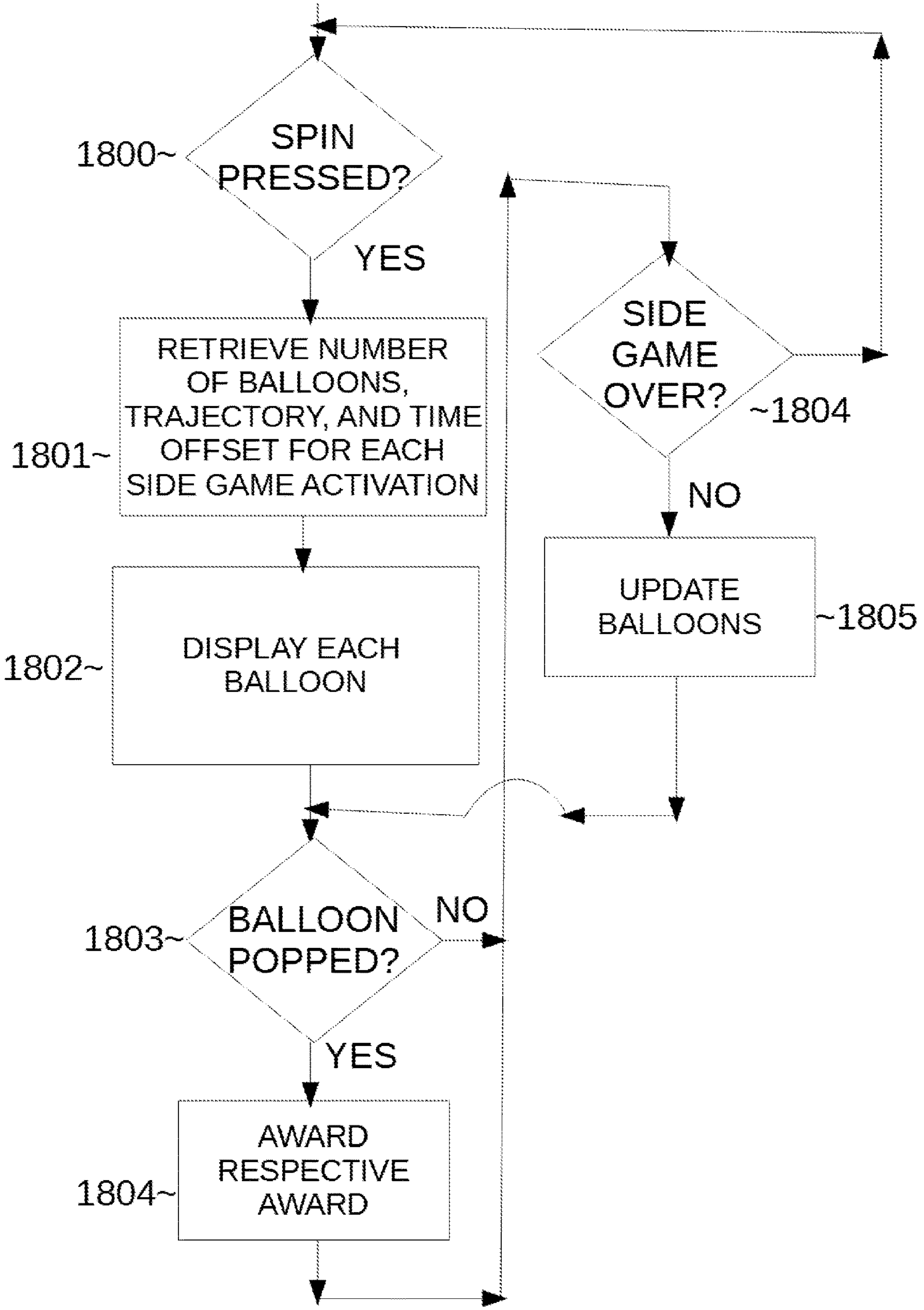
FIG. 18 is a flowchart illustrating implementing a balloon popping side game, according to an embodiment.

FIG. 18 is a flowchart illustrating implementing a balloon popping side game, according to an embodiment. As described herein, each slot spin result (outcome) will be stored and shared across all of the machines in the same tournament so that each player will ultimately receive the same outcomes (even if not at the exact same time). In the case of side games, if there are any parameters utilized by the side game (e.g., number of balloons released on each side game activation, direction of these balloons, time they are released, etc.) then the side game random variables will be randomly generated and stored in operation 400 as well. Each time the side game is initiated (in operation 1210) is referred to as a side game activation. So, for example, Nth (n being any number) side game activation during the tournament will have the same parameters (and hence appear the same) across all of the machines in the tournament. Note that the appearance of the same side game activation may start out the same, but may ultimately change based on actions of the player. For example, on one machine in a tournament, in the Nth side game activation five balloons are released at particular trajectories and the player immediately pops one, while on another machine in the same tournament the player is slower and does not pop a balloon immediately thereby causing more balloons to float around on the latter machine's side game. Thus, each side game activation will start out the same but may change throughout the course of the particular side game activation based on actions from the player. In an embodiment, some side game parameters may be carried over from one side game activation to the subsequent side game activation. In this embodiment, the same side game activation across different machines in the tournament (same tournament) do not necessarily have to start out the same since they have been affected by the player during previous side game activation(s).

In operation 1800, if the spin button is pressed, then this also drives (activates) the side game (without requiring any additional play credits or win credits) and so then operation 1801 is initiated.

In operation 1801, the parameters for each side game activation (number of balloons, the trajectory of each balloon when it first appears, and the time offset for each balloon) are retrieved from the server (these are all predetermined as stored in operation 400) based on the counter. The same counter used to retrieve the outcomes of the slot game can also be used to reference and retrieve the parameters for the side game (since each time the reels are spun by pressing the spin button a new side game is initiated). The time offset if the amount of time after the side game activation that a particular balloon appears. For example, balloon 4 may appear 3 seconds after the side game is activated (thus all balloons do not appear at once). Table III illustrates a set of example parameters for a set of side game activations for a balloon pop game. Note that many different types of side games are possible (whether described herein or not) and this technique could be applied to any other type of side game. The side game activation #column is the particular time the side game is activated (e.g., the counter will be at this number), the number of balloons (can be a random number from 3-5), and the direction is a random direction that each of the balloons will float. These parameters (and any others) can all be determined and stored in operation 400 in the same manner that the random slot machine game outcomes are predetermined and stored. Note that all balloons would start from the same location, although in another embodiment each balloon can have its own starting position as well. While Table III only shows three entries, there could be as many entries for the side game parameters as there are for the slot game outcomes, but in any case there should be more entries in Table III then activation that the player could possibly initiate so that there is never a side game without any respective parameters.

TABLE III

| Side game activation # | # of balloons | direction |
|---|---|---|
| 1 | 4 | 90, 80, 130, 150 |
| 2 | 5 | 85, 95, 34, 153, 109 |
| 3 | 4 | 76, 79, 76, 140 |

In an embodiment, each side game activation can be considered "non-deterministic" in that each side game activation (respective to the same counter) will start out identical to how it appears on all other machines.

While the direction shown in Table III is listed as simple direction (in degrees), the direction for each balloon does not have to be static and can change during flight (the change in direction and time of change can also be stored as a parameter as well so that each side game activation appears the same).

In another embodiment, the side games do not have to appear identical across different machines for the same activation (e.g., the respective to the same counter) however in this embodiment there may be an additional element of luck since some players may get a side game with more balloons (and hence more potential win credits to earn) than another player for the same side game activation.

Once the parameters of the particular side game activation (e.g., the counter=100 meaning this side game is the $100^{th}$ time the side game has been activated alongside the $100^{th}$ spin), then the method proceeds to operation 1802 which displays each balloon for this activation using the respective set of parameters (e.g., directions).

In Table III no time offset is given (and thus all balloons for each side game activation are released at the same time), but in an embodiment some balloons can be released immediately after the side game is activated (time offset=0) and some balloons can be released a short time after the side game is activated (time offset=1 second or other amount). Thus, the parameters for each side game activation can also include a time offset for each balloon and thus each balloon in the side game activation will be displayed in accordance with its respective offset (time offset).

From operation 1802, the method proceeds to operation 1803, which determines whether a balloon was popped. A balloon was popped when a payer selects (by touching on a touch-screen, using a pointing device and pressing a button, using a keyboard, etc.) a balloon. This can be determined by comparing the coordinates that the player currently selected with the coordinates of all displayed balloons to see if there is a collision.

If a balloon was popped (touched), then the method proceeds to operation 1804, which determines what the proper award is and awards it. This can also include deducting win credits (a penalty) if the player touched the wrong balloon (e.g., either one with a burning wick or a red balloon). As discussed herein, green balloons are worth the most points (points in the side game are really win credits), yellow balloons are worth less win credits, and red balloons lose win credits (a penalty). All balloons (regardless of color) that have a burning wick will also be a penalty and lose win credits (i.e. win credits are deducted from the player's/machine's (player and machine are generally used interchangeably in this context) total amount of win credits).

From operation 1804 (or operation 1803), the method proceeds to operation 1804, which determines whether the side game is over. Depending on the embodiment being implemented, the side game would be over based on a number of different factors. For example, in an embodiment, if the player presses the spin button again then the side game automatically ends and all current balloons are removed from the display. Note that in another embodiment, pressing the spin button while the side game is in progress would not end the side game as the player can press the spin and initiate a new spin while the currently displayed balloons remain and new balloons are added to the display). In an embodiment, the side game would automatically end when a predetermined amount of time since the side game was initiated (e.g., the reels stopped spinning) expires. In another embodiment, the side game would end when all balloons as part of the side game have been popped or have floated off the screen.

From operation 1804, the method proceeds to operation 1805, which updates the animation of the balloons on the display. The balloons will move according to their trajectory, change color gradually (from green to yellow to red and back to green which continues the cycle), wicks burn, etc. In an embodiment, while the side game is in progress the reels can be spinning (for example, when the spin button is pressed the reels spin and the side game begins simultaneously so that balloons are floating over the spinning reels).

Note that each time the spin button is pressed (and the method proceeds from operation 1800 to 1801) the counter will be increased (the same counter used to retrieve the slot machine game outcomes). Note that in an embodiment, a separate counter for the side game activations can be used which is different than the counter used for the slot machine game spins. However, this would not be needed since each spin of the slot reels should automatically activate a new side game. However, in another embodiment in which not ever spin of the reels activates a new side game, then the two separate counters should be used.

Note that while the balloons are floating, if the player presses the spin button then this can be handled in a number of different ways. In one embodiment, the spin button will not be active until all balloons on the side game have disappeared (either floated away or have been popped). Thus, the player must complete each side game before the player can initiate a new spin. In another embodiment, if the player presses the spin button while there are balloons being displayed (and the reels have stopped spinning) then the spin button will function and the reels will spin again and the current set of balloons remain floating (and can be popped) while a new set of balloons which correspond to a new activation of the side game will also be displayed a well. In this "fluid" embodiment, the side game would never affect/slow down playing the slot game since the spin button would not be dependent upon completion of the side game.

Note that regardless of the side game being implemented, all corresponding activations of the side games (e.g., the 12th side game activation on each machine) should appear identical without random elements so that the corresponding side game on one machine would not be considered harder than the same corresponding side game on another machine. Of course, as the side game is played, then actions by the player would naturally alter the course and the appearance of the side game. If players played each corresponding side game (e.g., the Nth activation of the side game) exactly alike then the course and appearance of this side game should be identical.

Figure 19:
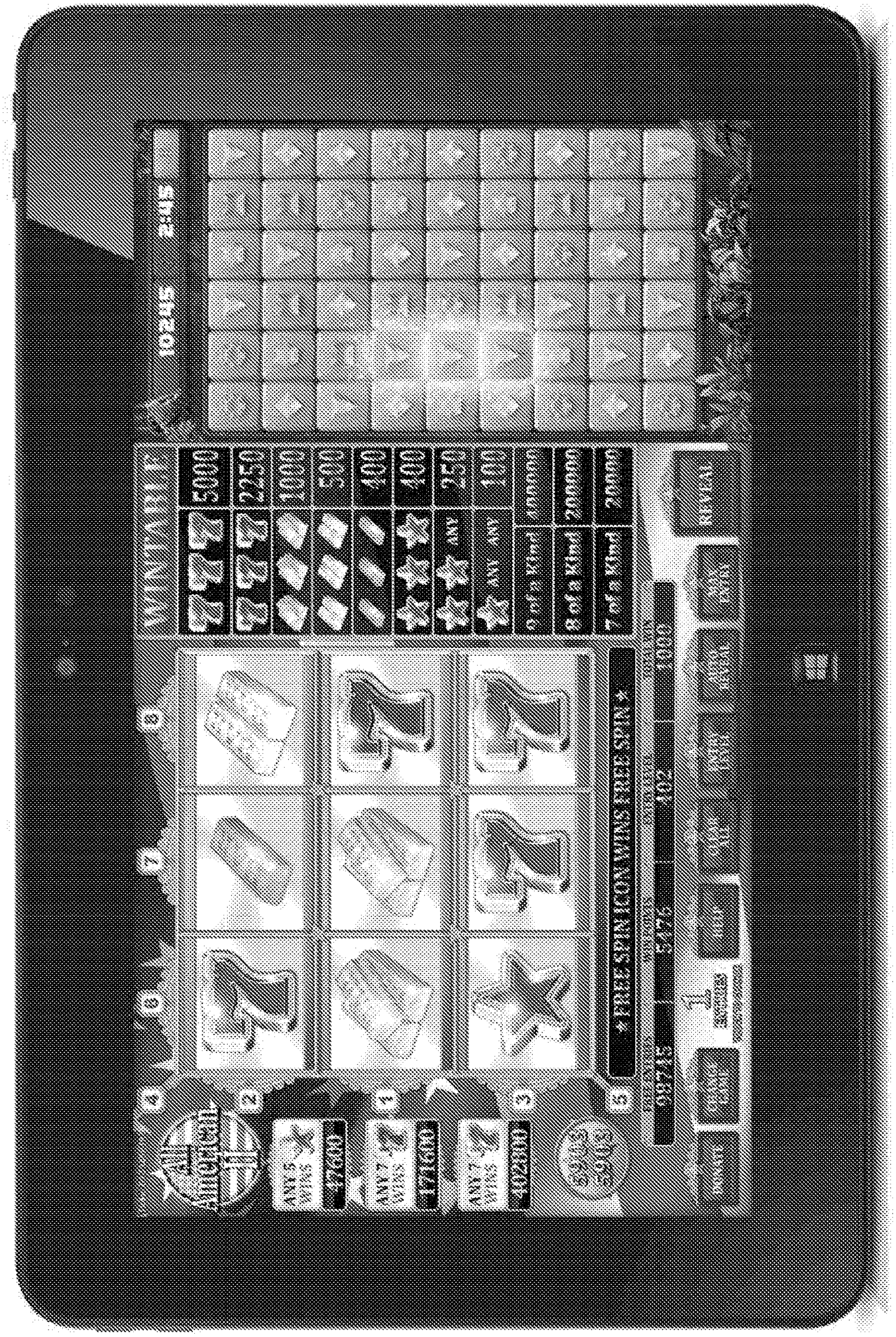
FIG. 19 is a drawing of a match-three puzzle side game played on a tablet, according to an embodiment.

FIG. 19 is a drawing of a match-three puzzle side game played on a tablet, according to an embodiment. Another side game that can be offered is a "match three" puzzle game. In this type of game, a grid is displayed and the player can select an icon and its neighbor to switch them. Three (or more) matching adjacent (horizontally or vertically) icons will then cause an award (based on the number of matching icons and the type of icon) and those icons will dissolve, causing the icons to "drop down" and new icons will fill in the open spaces on top. Chain reactions can occur when as the icons drop and fill in with new icons they form new matching three or more icons which then dissolve again. This process would repeat as long as the game board has any patterns of three matching adjacent icons. Table IV below shows a sample list of puzzle points awarded for different combinations of icons made. All awards in the side game are paid in win credits. Thus, for example, if the player makes a combination of three diamond icons, then the player will be awarded 20 win points which are added to the player's win point credit meter.

TABLE IV

| Icon | number of adjacent icons | points |
|---|---|---|
| Diamond | 3 | 20 |
| Diamond | 4 | 50 |
| Diamond | 5 | 100 |
| Ruby | 3 | 35 |
| Ruby | 4 | 75 |
| Ruby | 5 | 200 |
| Sapphire | 3 | 100 |
| Sapphire | 4 | 200 |
| Sapphire | 5 | 500 |

In FIG. 19, on the left side of the tablet, the slot machine (also referred to as slot game) is shown and on the right side of the tablet is the match three puzzle game. The "reveal" button is equivalent to the spin button described herein. Note that this slot game has a grid of three by three and eight paylines (three horizontal from left to right three vertical (from top to bottom), and two diagonal (bottom left to top right, and top left to bottom right).

Note that the match three side game can be implemented alongside the slot game in at least two ways. In one embodiment, the player will be allowed a finite number of moves (e.g., 2 moves although can be any other number such as 1-4) each time the side game is activated. A move is a switching of icons. Even if the reels stop spinning, the player is still allowed his/her finite number of moves in the side game. After the player's finite number of moves on the side game is used up the player cannot play the side game any longer and should spin the reels to activate the side game again and get a new set of finite moves on the side game. If the player presses the spin button again before the player has used up his/her finite number of moves then this can be handled in at least two ways: a) the reels can spin and the player would forfeit his/her moves that the player didn't take on the side game, or b) the reels can spin and the player would accumulate any moves that the player didn't take on the side game to use at a later time. Thus, when the reels have stopped spinning the player can continue playing the side game and using up as many accumulated moves as the player has (once the player has used up all of his/her accumulated moves then the side game can no longer be played until the reels are spun again). However, it would be in the player's interest to continuously spin the reels as quickly as possible to earn additional awards on the slot game.

In another embodiment, instead of the player having a finite number of moves on the side game, the player would have a finite amount of predetermined time to play the side game. For example, each time the spin button is pressed (and the reels are spun), then the player would get a finite amount of time (e.g., three seconds) to play the side game. During this finite amount of time, the player would have unlimited moves so it would be advantageous for the player to make as many moves as quickly as possible. If the player presses spin again before the finite amount of time for the side game has expired, then this can be handled in at least one of two ways: a) the finite time not yet used up can be accumulated (there would be a running counter of accumulated time so that this counter would have to run down before the side game would stop playing until the next time the reels are spun), or b) any finite time not yet used up would be lost by the player once the spin button is pressed again and the reels respin again.

In this manner, while the player is playing the slot machine (on the left side of the screen), simultaneously the player is playing the match three game on the right side of the screen. A touch-screen (or any other input device) can be used to receive all player inputs (including press of the spin button, selecting which icons to switch, etc.) Player skill comes from being able to press the spin button as quickly as possible as well as playing the match three game as skillfully as possible to earn the most points.

Note that the composition (which particular tiles are in each location on the game board/grid) of the icons in the match three game should be the same for all machines playing in the tournament (e.g., the same tournament). This is considered a side game parameter and predetermined for all machines in the tournament. On each machine's first activation of the side game (or even before the first activation, upon beginning the tournament the side game board would typically be displayed) the game board would be identical for all machine thereby not giving any particular machine an advantage over another. The icons that drop in from above can also be predetermined and stored (in operation 400) as well so that all players initially have the same set of parameters. In other words, if each player in the tournament played the side game in the exact same way (e.g., choosing the exact same icons to switch), then each player would be presented with the exact same results. Once players start playing in different ways (e.g., choosing different icons to switch) then the game boards will start to diverge and look different. The icons that drop from above will all be predetermined and pre-stored so they can be retrieved and utilized by each machine throughout the tournament. For example, an array of large amount of predetermined icons for each column (e.g., 1000 or so for column, more than a player could possibly use during the player of a tournament) will be stored. In this way, the set of tiles that falls in each column to replace dissolved tiles would be identical from machine to machine. Table V below represents a sample array of additional tiles that are pre-stored. While only three entries in Table V are shown, it can be appreciated that a very large number (e.g., 1000 or more) such entries would be utilized in a real tournament.

TABLE V

| # Column 1 | column 2 | column 3 | column 4 | column 5 | column 6 |
|---|---|---|---|---|---|
| 1 Ruby | sapphire | diamond | diamond | ruby | diamond |
| 2 Sapphire | pearl | diamond | pearl | ruby | ruby |
| 3 Pearl | wild | ruby | ruby | diamond | pearl |

Thus, the icons in Table V are shared across machines so that in addition to each machine starting with the same grid (i.e., the same tiles in the same positions), each time a new tile is needed in each column, the new tile would be taken from this array to be in the identical sequence across different machines. Each machine would have a column counter for each column and at the start of the tournament the column counters would set to 1. Thus, the first time a column 1 icon is needed it would be a ruby, the second column 1 icon would be a sapphire, and so on. In this way, the tiles dropped from machine to machine in the side game are not different, although based on the player decisions made in the side game one game board could look entirely different from another game board. However, the difference in appearance would be due to the skill and choices of the player, not necessarily due to luck or random factors.

In further embodiment, "mistake finding" side game can be offered. A mistake finding side game is a game in which the player has a limited amount of time to identify and touch a visual element displayed on screen that is considered erroneous. For example, a word can be misspelled, an item can be displayed which does not belong on a slot game (e.g., a bowling ball) or any abnormality. The player's goal is to touch (or select) the abnormality before a predetermined amount of time expires.

Figure 20:
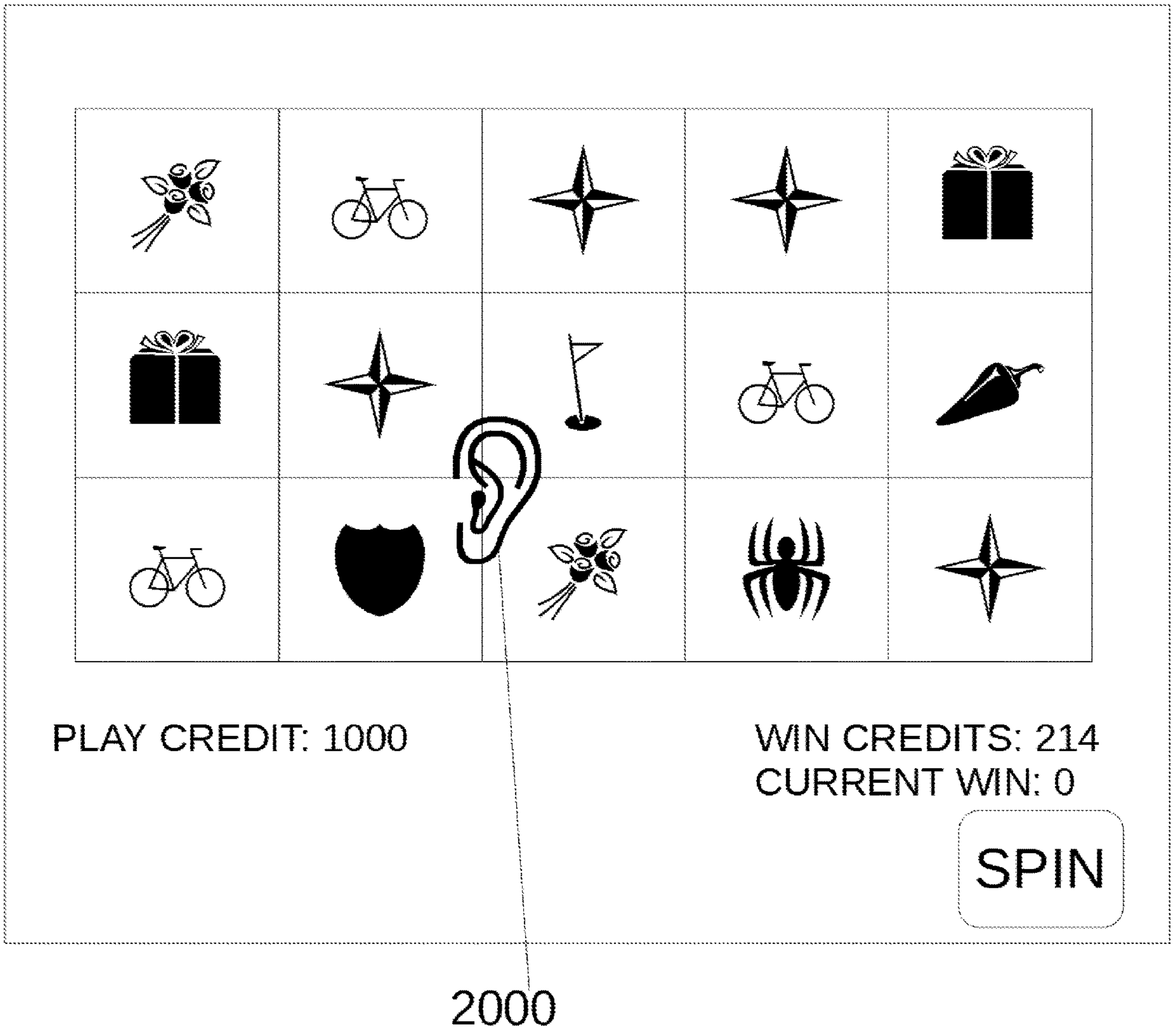
FIG. 20 is a drawing of a illustrating a slot machine game and a mistake finding side game, according to an embodiment.

FIG. 20 is a drawing of a illustrating a slot machine game and a mistake finding side game, according to an embodiment.

In the slot machine game, an ear 2000 appears as a symbol on one of the reels. The ear obviously does not belong in the game as it is not used on any paytable and is not a symbol on any of the reels in the typical game. The player's goal in this mistake finding side game is to touch/select the erroneous object (the ear 2000) as quickly as possible.

Note that the erroneous object would be the same in all side games across all machines during the tournament so that one side game on one machine could not be considered harder than another.

In FIG. 20, once the player touches the ear 2000 then the ear 2000 would disappear and the player would be awarded points (win credits) based on how long it took the player to select the object (measured after the reels stop spinning). Note that all points or credits awarded with regard to all side games are win credits. If the erroneous object is not find within a predetermined amount of time then the player would not get any win credits for this side game activation. A Table such as Table VI can be used to determine how many win credits to award the player for finding the "mistake" (erroneous object).

TABLE VI

| Time to find | erroneous symbol award (in win credits) |
|---|---|
| 0-1.5 seconds | 100 |
| 1.5-3 second | 50 |
| 3+ seconds | 0 |

So, for example, if the player touches the ear 2000 after exactly 1 second after the reels stop spinning, then the player would win 100 win credits.

Note that in addition to the potential for winning the award for touching the erroneous object, the erroneous object would then morph into a wild symbol and the slot machine game would then pay the player the win credits based on the symbols shown using the new wild symbol.

Figure 21:
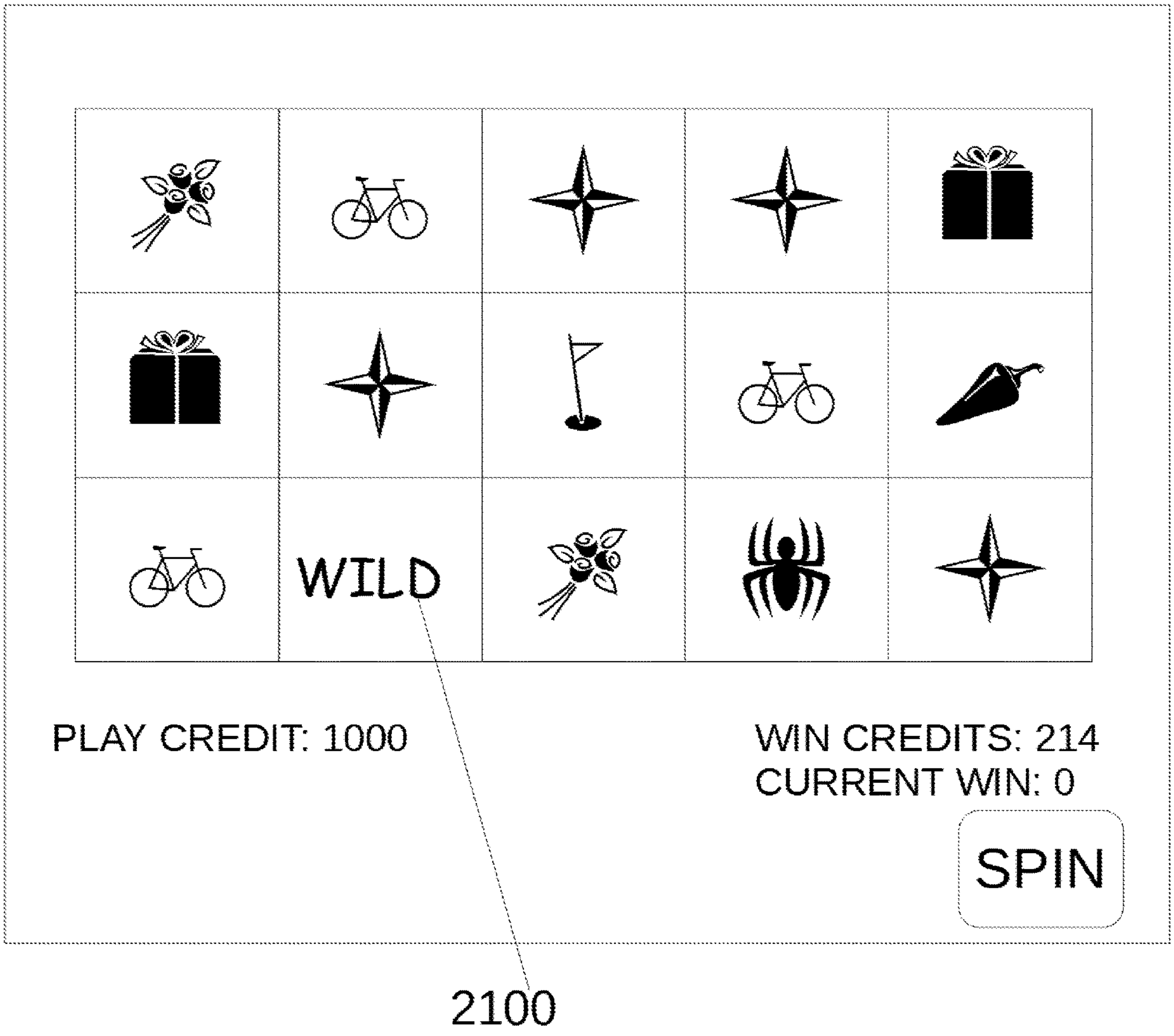
FIG. 21 illustrates the slot machine game with the erroneous symbol morphed into a wild symbol, according to an embodiment.

FIG. 21 illustrates the slot machine game with the erroneous symbol morphed into a wild symbol, according to an embodiment.

The erroneous symbol (the ear 2000) has now morphed into a wild symbol 2100 and now the slot machine game award (if any) can be computed and awarded. The wild symbol 2100 is known in the art and will substitute for any other symbol so that each payline would make the highest possible paying combination (if any is possible). Of course a wild symbol is desirable from the player's perspective.

Figure 22:
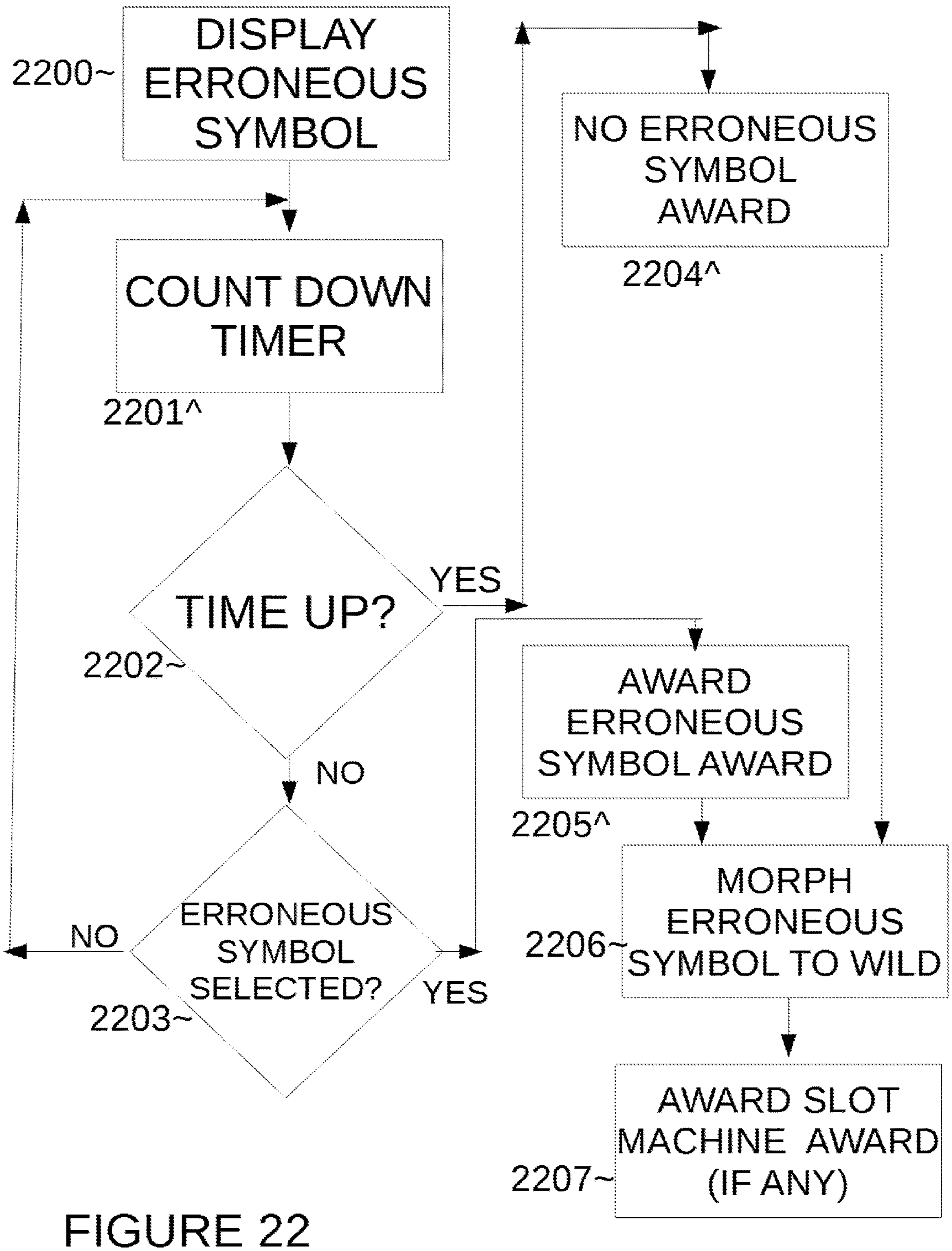
FIG. 22 is a flowchart illustrating an exemplary method of implementing a mistake finding side game, according to an embodiment.

FIG. 22 is a flowchart illustrating an exemplary method of implementing a mistake finding side game, according to an embodiment.

In operation 2200, the erroneous symbol is displayed after the spin stops. The erroneous symbol (and location) is randomly determined (such as in operation 400) so it is common across all of the same activations for each of the machines in the same tournament.

From operation 2200, the method proceeds to operation 2201, which counts down a timer. The player has limited time to find the erroneous symbol and the quicker the player can do so the better (see Table VI). The timer would start counting down from the moment the reels stop spinning and the player can see the erroneous symbol and has the ability to select it.

From operation 2201, the method proceeds to operation 2202, which determines if the allotted time to find the erroneous symbol is up. This can be any amount of time, although in Table VI it is three seconds. If this amount of time is up (and hence the player did not successfully select the erroneous symbol) then the method proceeds to operation 2204 in which no erroneous symbol award is awarded to the player and the method proceeds to operation 2205.

In operation 2202, if the allotted time (e.g., three seconds) is not up yet, then the method proceeds to operation 2203, which determines whether the erroneous symbol is selected. It can be selected by the player using the electronic input device (e.g., touching the erroneous symbol on a touch screen, using a pointing device to point to and click (by pressing a button) the erroneous symbol, etc.) Note that if the player selects the wrong symbol then typically nothing would happen. If the player has not selected the erroneous symbol, then the method returns to operation 2201.

If in operation 2203, the player has selected the erroneous symbol, then the method proceeds to operation 2205 which awards the player the erroneous symbol award based on the time that it took (measured from when the reels stopped spinning) to make the correct selection (e.g., see Table VI).

From operations 2205, 2204, the method proceeds to operation 2206, which morphs (changes) the erroneous symbol to a wild symbol (see FIG. 21).

From operation 2206, the method proceeds to operation 2207, which then computers an award earned from the combination of symbols shown considering the wild symbol that is now present on the slot grid (which replaced the erroneous symbol). This can be done as described herein. Of course, if no winning combination is present on any payline (even considering the wild symbol) then the player would get no award. If there is at least one winning combination on any of the paylines (considering the wild symbol), then the player would win awards on all winning combinations (as always, paid in win credits).

Note that during the mistake finding side game, the player can simply press spin and spin the reels again before the time runs out. Hence, the player will forfeit any erroneous symbol award. However, the erroneous symbol will still morph into the wild symbol and the player would still receive any potential award in operation 2207. In other words, if the player prematurely (before the time is up) presses the spin button, then the method would proceed to operation 2204.

In a further embodiment, an expanding wild side game can be offered. An expanding wild side game is a side game in which whenever a wild symbol appears on the reels the player should touch the wild symbol as soon as possible. The sooner the player touches (selects) the wild symbol, the more wild symbols will be generated. In one embodiment, every spin will have a wild symbol for the player to touch. In another embodiment, only some spins will have a wild symbol for the player to touch, and the spins that do not have a wild symbol simply will not have an associated side game.

Figure 23:
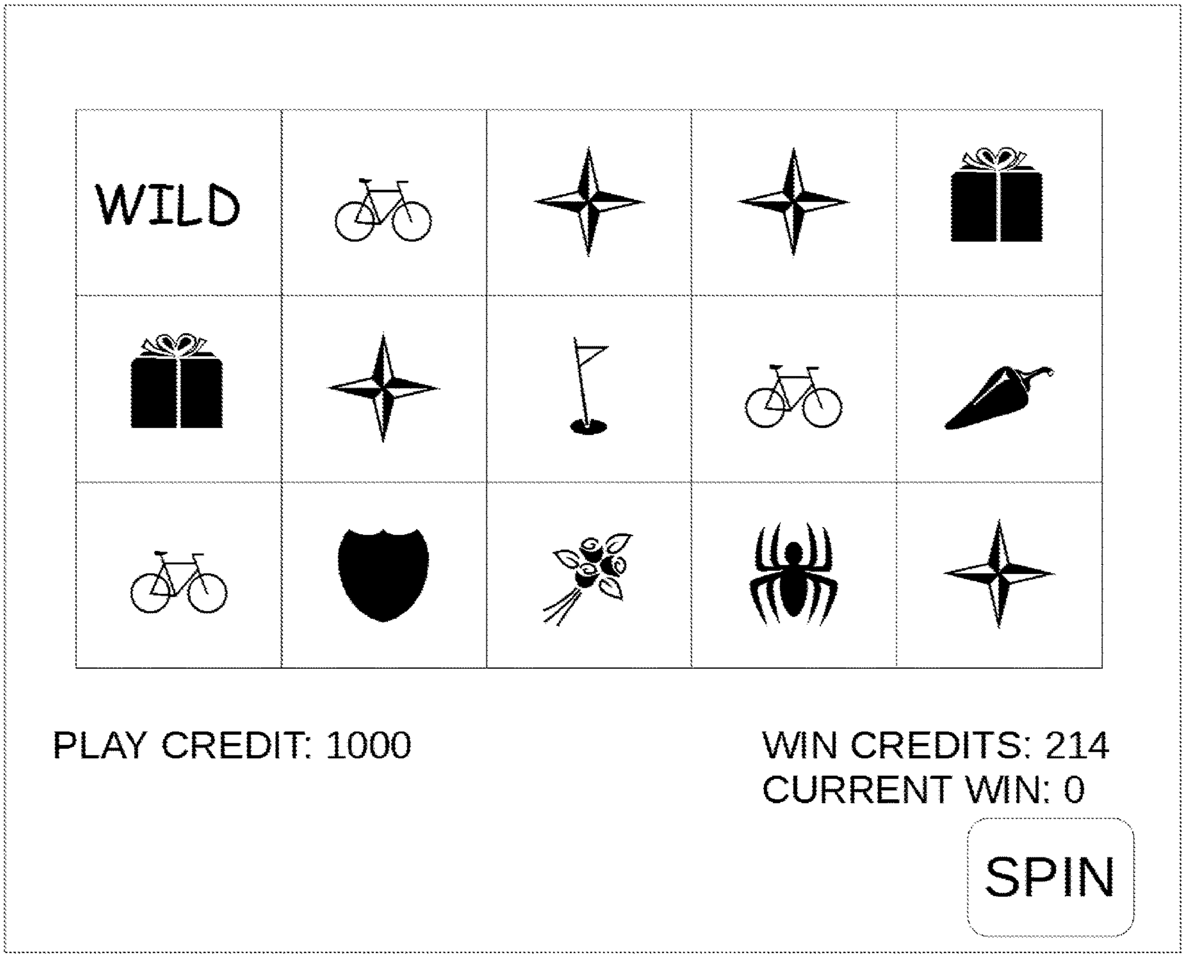
FIG. 23 is a drawing illustrating a slot game result with a single wild symbol, according to an embodiment.

FIG. 23 is a drawing illustrating a slot game result with a single wild symbol, according to an embodiment.

Note this spin has a wild symbol in the upper left position on the grid. The player has a limited amount of time to touch/select this wild symbol. Table VII illustrates one example of time limits and respective results. Note that all time ranges mentioned herein are non-overlapping (so no time can qualify for more than one result) and all variations are covered, for example at exactly 1 second this could fall into the first row (2 wilds) or the second row (1 wild), etc.

TABLE VII

| Time | result |
|---|---|
| 0-1 seconds | 2 wilds |
| 1-2 seconds | 1 wild |
| 2+ seconds | 0 wild |

If the player successfully touches the wild symbol in less than one second, then the player will get two additional wilds. This is accomplished by converting the remaining two positions in the same column as the original wild symbol to wild symbols (see FIG. 25). If the player successfully touches the wild symbol between one and two seconds, then the player would get one additional wild symbols. One of the other positions in the same column would get the additional wild symbol (for example the higher available position), see FIG. 24. If the player takes longer than two seconds, then the player does not get any additional wilds (but still gets the original wild that was displayed as illustrated in FIG. 23). Then the player's awards for the slot game are determined using however many wilds the player has (whether it's one, two or three) and awarded to the player (machine).

Figure 24:
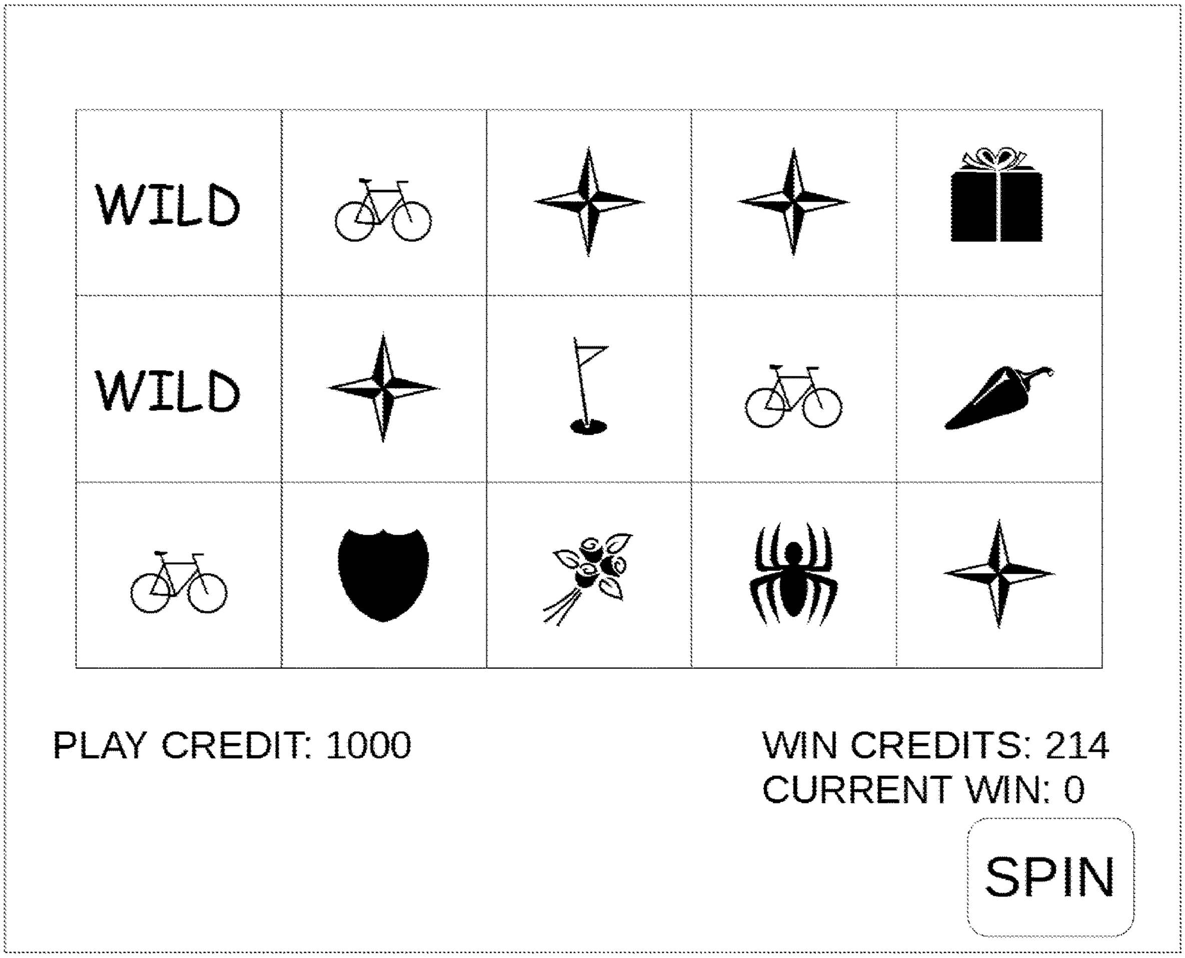
FIG. 24 is a drawing illustrating a slot game result with one expanded wild symbol, according to an embodiment.

FIG. 24 is a drawing illustrating a slot game result with one expanded wild symbol, according to an embodiment.

Note that the expanded wild (for a total of two wilds) is in the same column as the original wild and would appear on the higher vertical position (so the position is the same throughout all of the machines for this side game activation).

Figure 25:
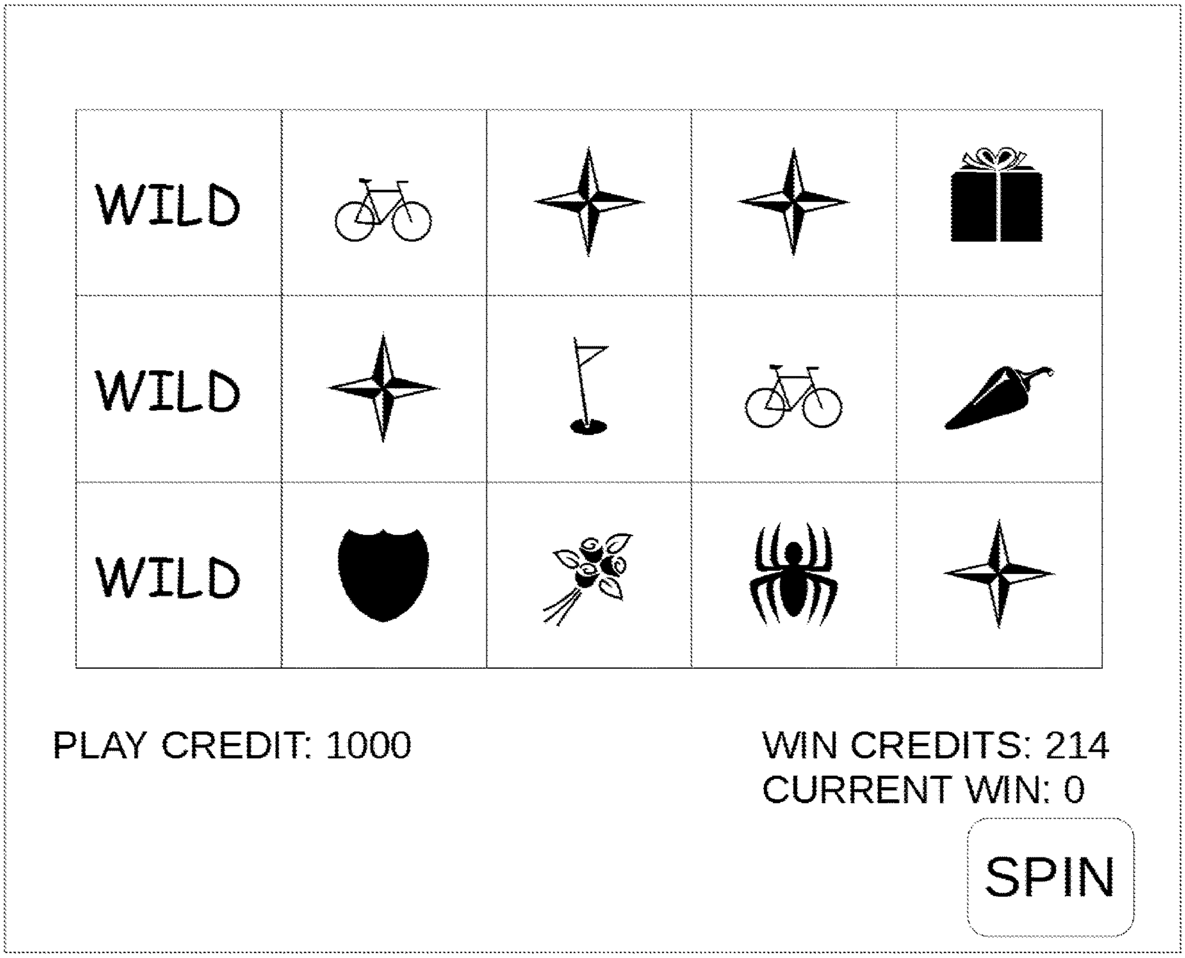
FIG. 25 is a drawing illustrating a slot game result with two expanded wild symbols, according to an embodiment.

FIG. 25 is a drawing illustrating a slot game result with two expanded wild symbols, according to an embodiment.

Note there are two expanded wilds (for a total of three wilds) in the same column as the original wild.

Figure 26:
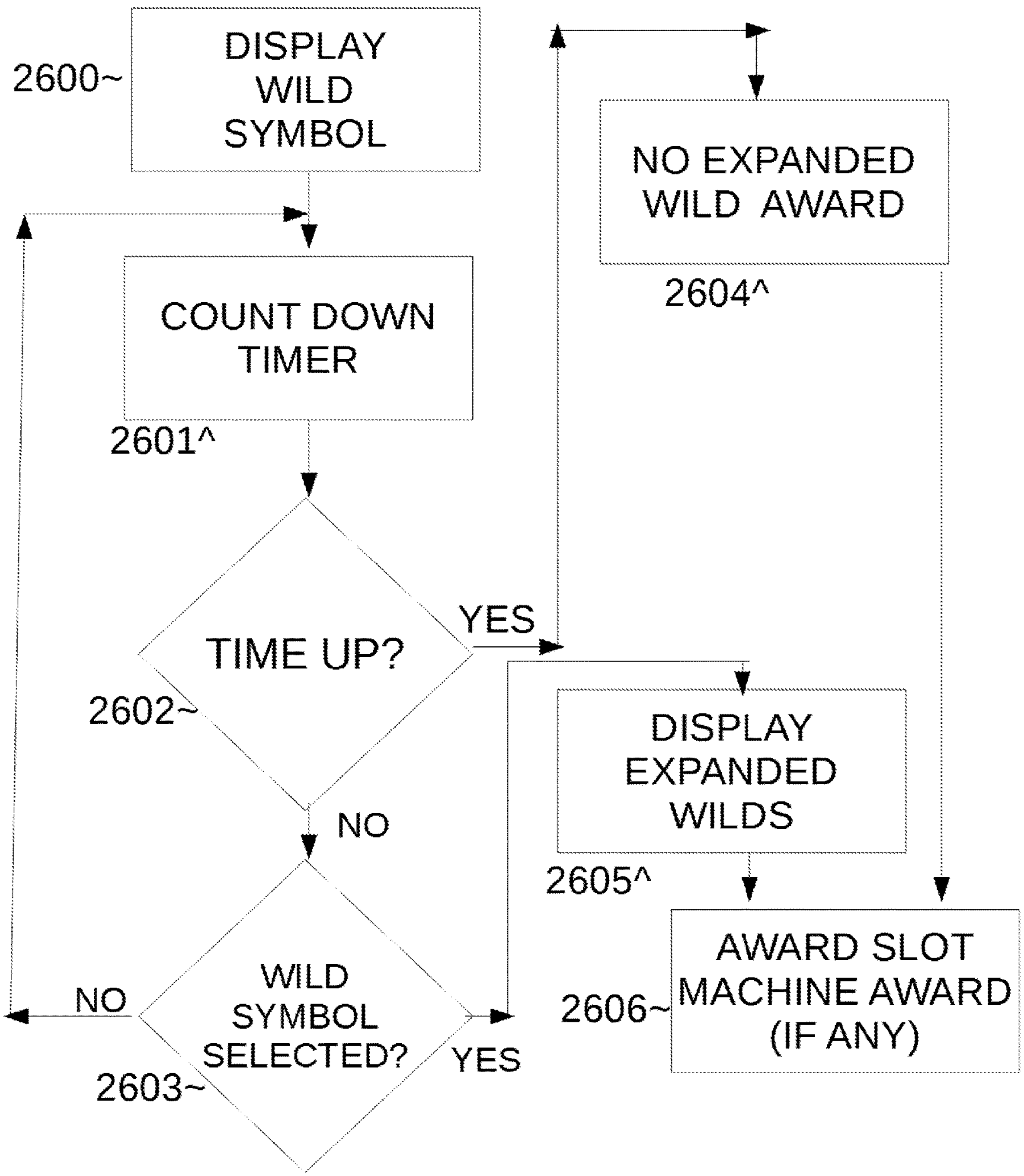
FIG. 26 is a flowchart illustrating an exemplary method of implementing an expanding wild side game, according to an embodiment.

FIG. 26 is a flowchart illustrating an exemplary method of implementing an expanding wild side game, according to an embodiment.

In operation 2600, the reels stop spinning and a wild symbol is displayed. See FIG. 23. The wild symbol can appear on any position in the grid. Typically, the position of the wild symbol is predetermined and the same across all machines in the tournament for the particular spin (as described herein). In this way, no player has an unfair advantage (because a wild symbol may be more valuable depending on the particular position on the grid based on the remaining symbols).

From operation 2600, the method proceeds to operation 2601, which initiates a timer which starts from the point the reels stop spinning and the player is able to select the wild symbol. The time starts running once the reels stop spinning and the player is able to touch the wild symbol.

From operation 2601, the method proceeds to operation 2602, which determines whether the time is up. The player will have a predetermined amount of time to select (touch) the wild, e.g., less than 2 seconds). If the time is up (e.g., more than 2 seconds expire), then the method proceeds to operation 2603 wherein no expanded wilds are awarded and the method proceeds to operation 2606.

If the time is not up, then the method proceeds to operation 2603, which determines whether the wild symbol was selected. If the wrong symbol was selected either nothing would happen or the player can be penalized (e.g., lose 20 (or any other amount) of win credits). If the wild symbol was not selected, then the method returns to operation 2601.

If in operation 2603, the wild symbol was selected, then the method proceeds to operation 2605 which displays the amount of expanded wilds earned based on how much time expired before the player successfully touched the wild symbol (see Table VII). FIG. 24 is an example of one expanded wild, and FIG. 25 is an example of two expanded wilds.

From operations 2604, 2605, the method proceeds to operation 2606 which awards any earned slot machine awards based on the outcome of the spin considering the wild symbols shown (either one, two, or three), as described herein.

If the player presses spin again before the allotted time is up, then the player would forfeit the ability to obtain any expanded wilds and hence the method would proceed to operation 2604.

Another side game that can be offered is a "whack a mole" side game, in which the player must use mechanical skill to touch (select) creatures that pop out of holes in order to earn win credits. After the reels spin, this side game is overlaid (displayed over) the slot reels and does not utilize the results from the slot game (unlike the expanding wild and the find the mistake games). The game lasts for a limited amount of time. There are a plurality of holes displayed. There are two types of animals (e.g., a fox and rabbit). The goal is for the player to touch the foxes as soon as possible and not to touch the rabbits. If the player touches the rabbit then the player loses points (win points), while if the player touches the fox then the player gains points (win points).

Figure 27:
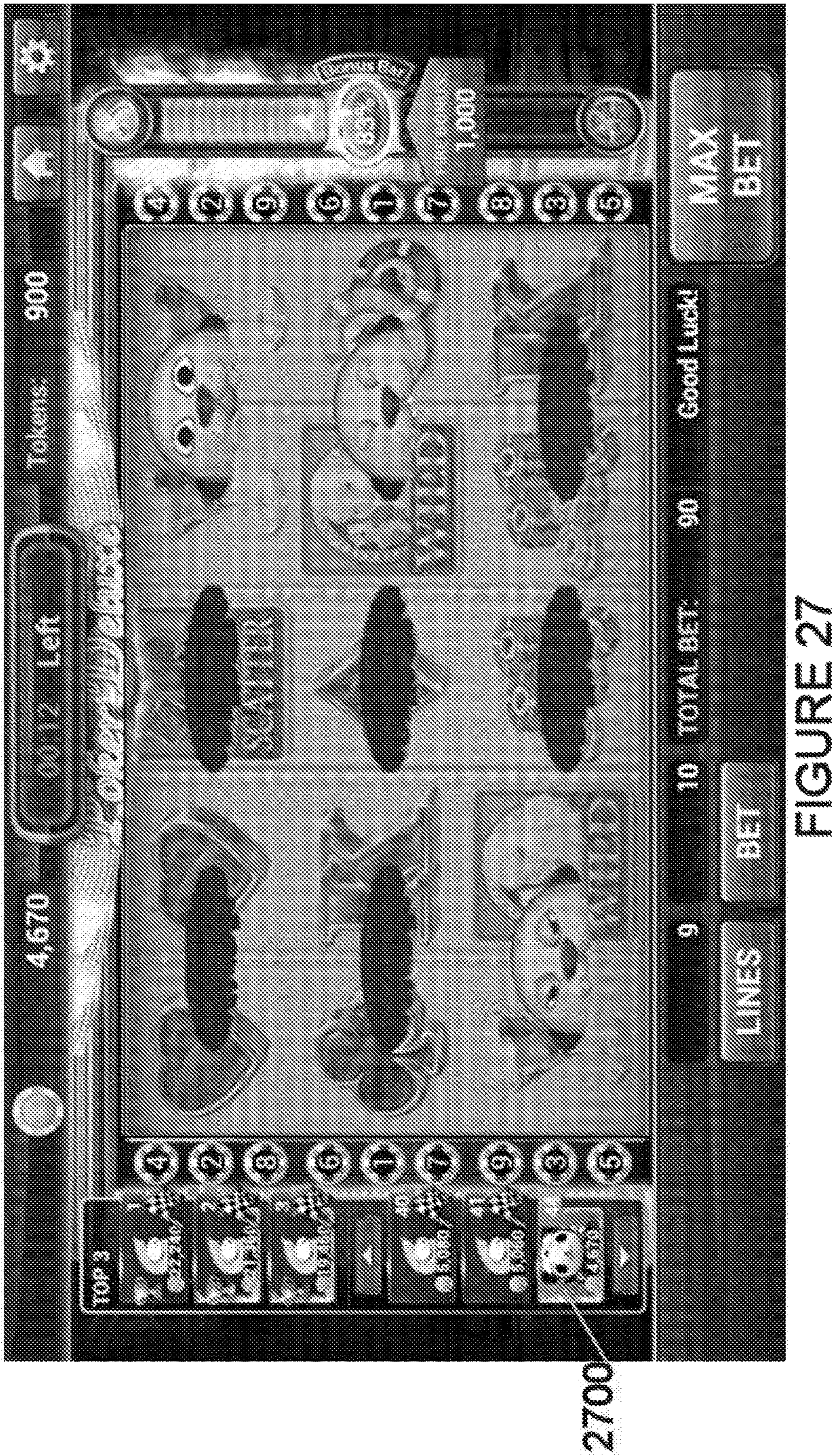
FIG. 27 is a screen illustrating an exemplary whack a mole side game, according to an embodiment.

FIG. 27 is a screen illustrating an exemplary whack a mole side game, according to an embodiment.

The game shows nine holes. At random times, an animal (a fox or a rabbit, but of course any animals can be used) will pop out of the holes. The amount of points the player gets for touching the fox would vary based on how long it takes the player to touch the fox. For example, once a fox is to first appear, the first second it will be on its way up the hole, then for a half second it will remain at the top of the hole, and then for another second it will be on its way down the hole. If the player touches the fox on its way up or down, the player will get X points (X can be any predefined amount of win credits such as 10), while if the player touches the fox while it is remaining at the top of the hole then the player will get 2X points. If the player touches a rabbit then the player will lose Y points (Y can be equal to X but is not required to be).

Note that in the embodiment shown in FIG. 27, a side leaderboard 2700 is shown. The side leaderboard serves the same function as the leaderboard shown in FIG. 11, however, in this embodiment the player can see the leaderboard while the player is playing the game. The side leaderboard 2700 shows the top three scores (amount of win credits) as well as the current player's (machine's) rank (in this example the rank is 44). The ranks are how each player ranks in order from most win credits to lowest win credits. While not shown, the side leaderboard 2700 can also show how many players are currently in this tournament (e.g., 100).

Figure 28:
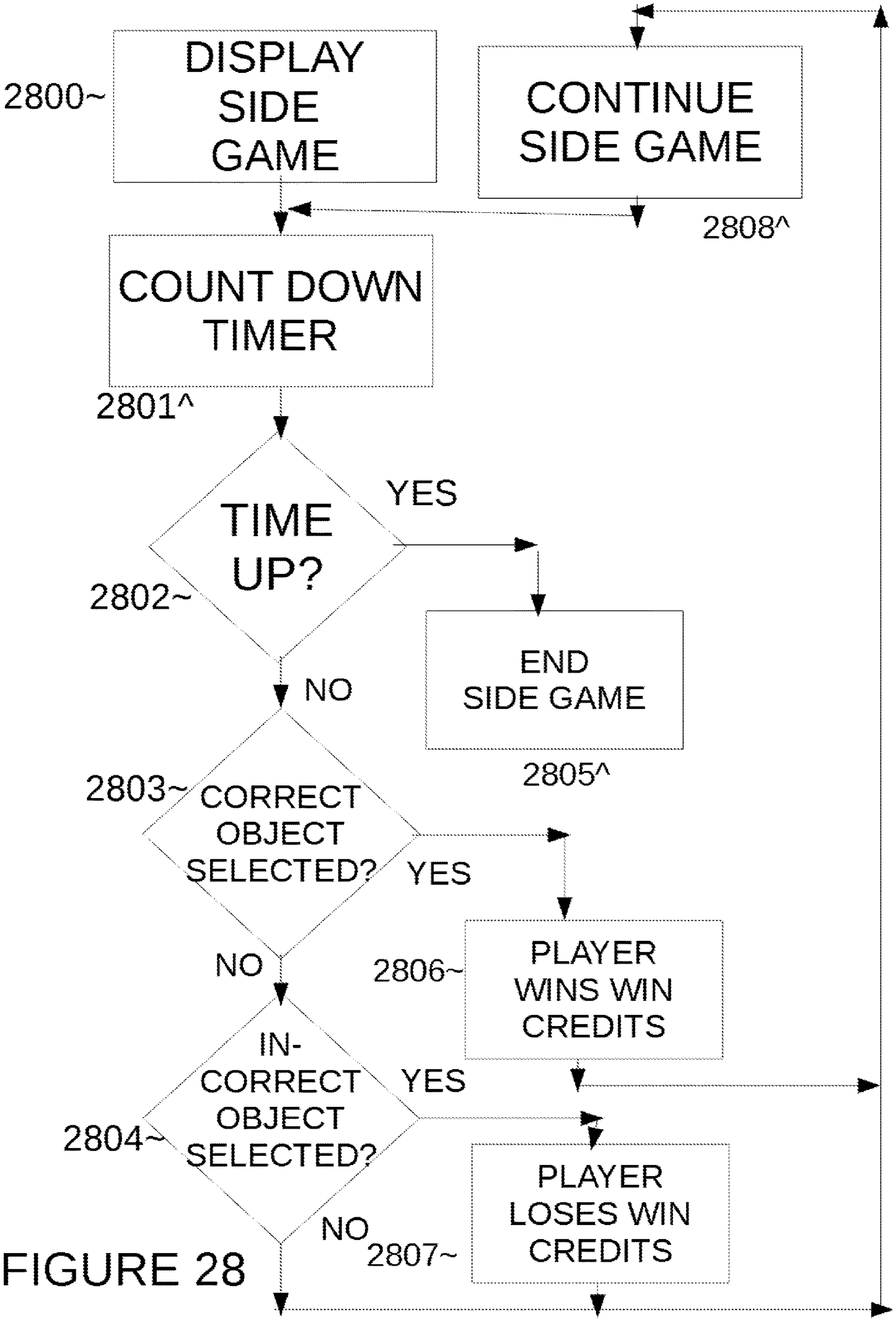
FIG. 28 is a flowchart illustrating an exemplary method of implementing a whack a mole side game, according to an embodiment.

FIG. 28 is a flowchart illustrating an exemplary method of implementing a whack a mole side game, according to an embodiment. FIG. 28 can also be applied to any type of side game which has player targets which earn credits when selected and other targets which lose credits when selected.

In operation 2800, the side game is initiated (after the spin is completed and the award, if any, from the outcome of the spin is paid). The initiation can be done as described herein. All different machines in the same tournament should display the same side game (along with its parameters) for the same side game activation. The side game board is now displayed (either over the slot reels as illustrated in FIG. 27 or on the side).

From operation 2800, the method proceeds to operation 2801, which initiates a timer. The side game will only last for a finite amount of time (e.g., five seconds) and then will stop. The amount of time remaining on the timer may or no may not be displayed depending on the embodiment. If the time is up in operation 2802, then the method proceeds to operation 2805, which ends the side game. The player has to press spin to initiate a new spin of the slot game (which will trigger a new side game after the spin is completed).

From operation 2802, the method proceeds to operation 2803, which determines whether a correct object has been selected (e.g., touched). A correct object in the whack a mole game would be the fox (but not the rabbit). There can be more than one correct object, each with its own respective prize distribution. If a correct object has been selected (the area selected/touched is in a collision with a correct objects location), then the method proceeds to operation 2806, which awards the player win credits. The amount of win credits awarded can depend on the status of the object (e.g., on its way in, on top, on its way out). The amount of win credits awarded can also depend on the amount of time the object has been displayed (e.g., as the time that the object is displayed increased the amount of the win credits awarded would decrease). From operation 2806, the method would proceed to operation 2808.

In operation 2803, if a correct object is not selected, then the method proceeds to operation 2804, which determines whether an incorrect object is selected. This can be done the same way as operation 2803 (e.g., checking for collisions) but in this operations collisions for incorrect objects are checked for. If an incorrect object is not selected, then the method proceeds to operation 2808.

In in operation 2804, an incorrect object is selected, then the method proceeds to operation 2807, wherein the player loses win credits (a penalty). The amount of win credits lost can be a constant or can be based on a distribution (e.g., different incorrect objects have different win credit loss amounts). From operation 2807, the method proceeds to operation 2808.

In operation 2808, the side game is continued. All animations are updated (e.g., any moving objects continue to move), sounds are updated, etc. From operation 2802, the method proceeds to operation 2801.

In a further embodiment, another side game that can be implemented is a moving zone game. A moving zone game is a side game which has different zones (areas), some of which are good (award win credits when touched) and some of which are bad (will lose win credits when touched). Some zones can be stationary while zone can be moving.

Figure 29:
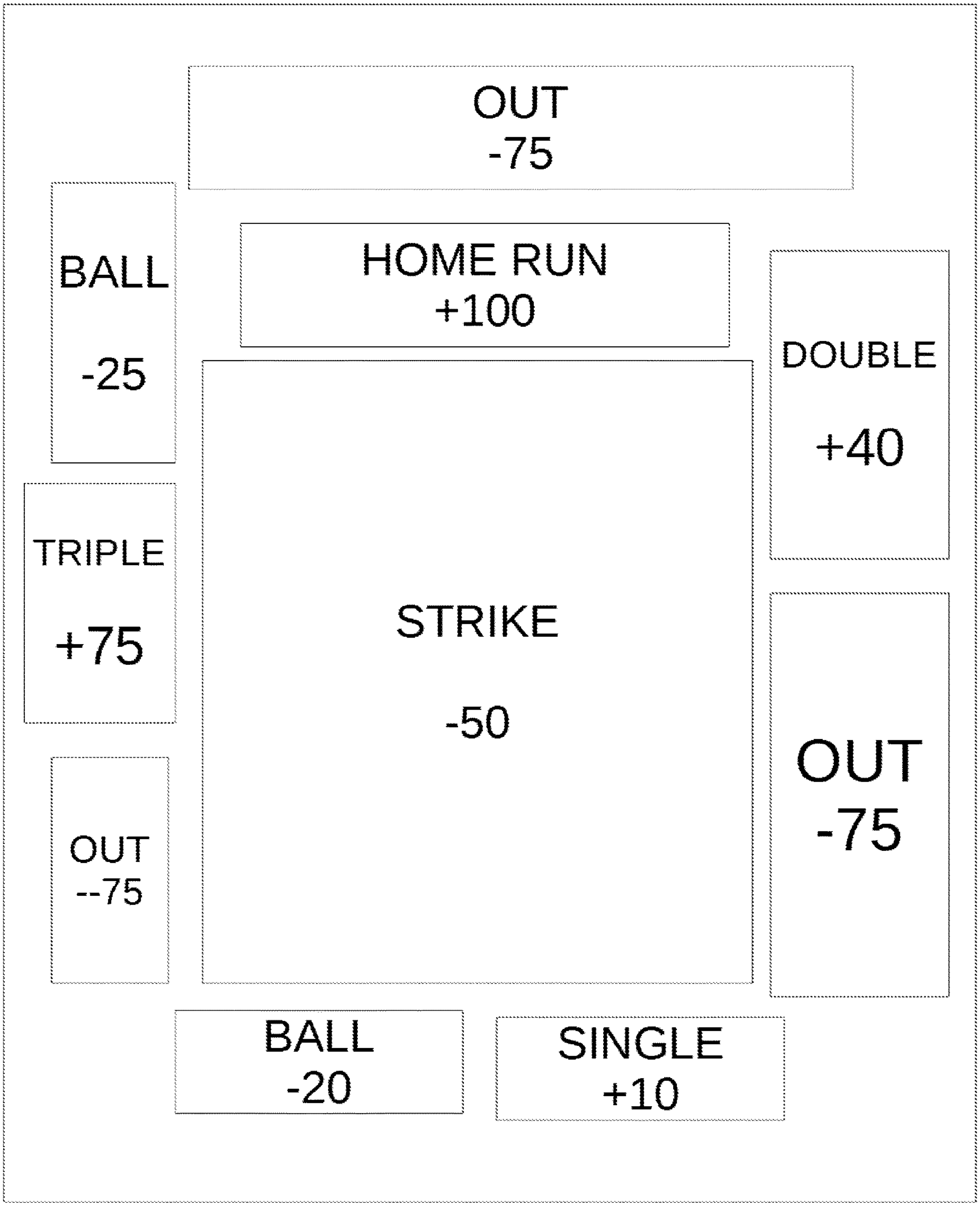
FIG. 29 is a drawing of an exemplary moving zone game, according to an embodiment. There are different zones (shown as rectangles although the zones can be any shape) and the win credit awards (or penalties) for touching those zones.

FIG. 29 is a drawing of an exemplary moving zone game, according to an embodiment. There are different zones (shown as rectangles although the zones can be any shape) and the win credit awards (or penalties) for touching those zones. Note that the zones will be displayed and the player will not have very much time (e.g., one second) to touch a zone. Therefore, the player has to act very quickly making the game challenging to touch the best zone in time. The zones may also move around using computer animation making the desirable ones harder to touch.

The method illustrated in FIG. 28 can be applied to the moving zone game illustrated in FIG. 29 (and many other types of side games as well). Each zone has an amount of win credits that would be added to the player's win credit meter when that respective zone is touched. Positive numbers are awards and negative numbers are penalties. Each time the side game is initiated, a different such game board (illustrated in FIG. 29) can be used. As with all side games, the presentation for the same activations of a side game must initially be the same as well as the game play that does not depend on player action (for example the zones, points values, and animations of the zones would have to be the same). In this way, one player would not get luckier by having an easier side game to play than another for the same side game activation.

In one embodiment, after the screen is touched once (whether or not a zone is touched) the side game ends (e.g., in operation 2808 the side game would then end). In another embodiment, after a single zone is touched, the side game ends (e.g., in operation 2808 the side game would then end). In an embodiment, if the time is up before the player has touched a zone, then the game can either (depending on the embodiment) award the player nothing, or penalize the player (e.g., deduct 20 win credits) for not touching anything before the allotted time (e.g., 2 seconds) expires.

Figure 30:
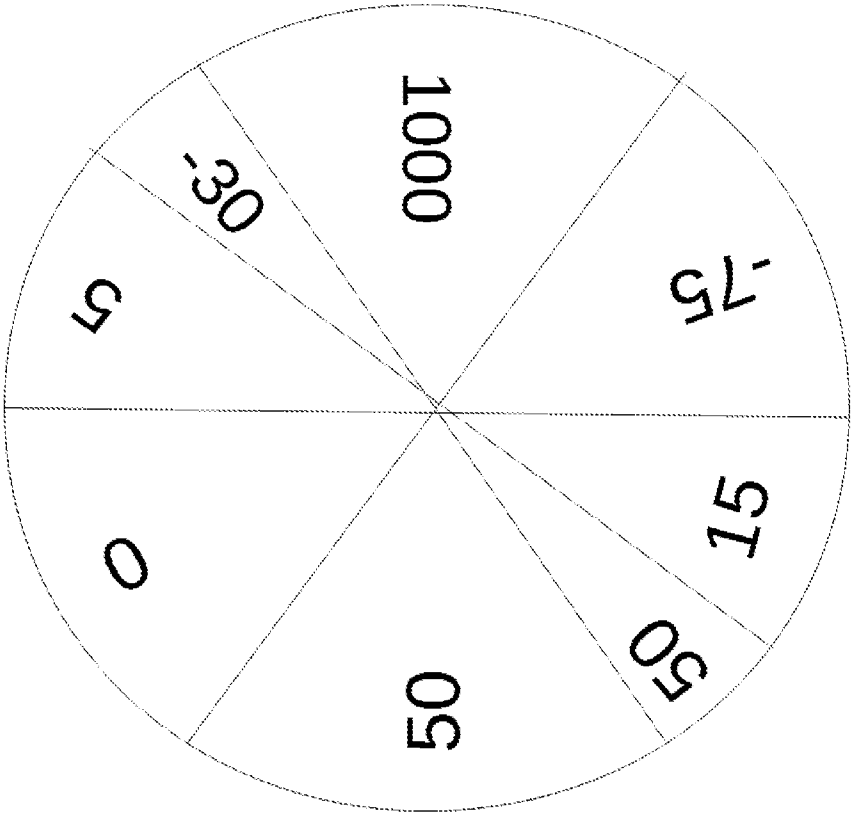
FIG. 30 is a drawing of an exemplary spinning wheel game, according to an embodiment.

FIG. 30 is a drawing of an exemplary spinning wheel game, according to an embodiment. This operates as the moving zone game does and can utilize the method illustrated in FIG. 28. However, the wheel spins and once a zone (area on the wheel with an award or penalty) is selected then the side games ends (proceeds to operation 2805).

Figure 31:
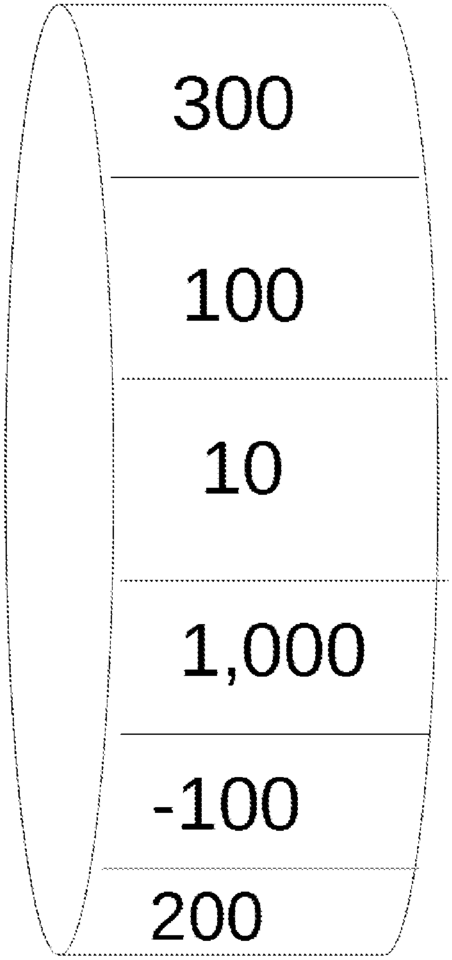
FIG. 31 is a drawing of an exemplary spinning disc game, according to an embodiment.

FIG. 31 is a drawing of an exemplary spinning disc game, according to an embodiment. This operates as the game illustrated in FIG. 30, but the wheel is presented in this front, three-dimensional view.

Note that any skill game (such as those illustrated in FIGS. 30-31) which require a player to stop (by touching) a spinning (or moving) object (e.g., the zones, wheel, etc.) will require skill. The spinning (or moving) object will be moving fast but not overly fast such that the players mechanical actions would effectively turn into a random result (e.g., if the spinning wheel is too fast, the player won't typically have any ability to improve his outcome because his/her hand/eye coordination will not be that fast) and hence this will result in an effective random result. Thus, the spinning/moving object(s) will be moving fast but not so fast that the element of player skill is removed (or even reduced). Enabling the player to improve his/her score (amount of win credits earned) by using their mechanical skill is of the utmost importance since the skill game is driven by player skill and not luck. Thus, a spinning wheel (e.g., FIG. 30) will be spinning at a speed which is fast but still slow enough to enable a skilled player (one with relatively good hand/eye coordination) to be able to improve his/her chances of touching the highest award. It is possible, but unlikely, that a player will be skilled enough to be able to touch the highest award on every spin. However, more skilled players will be able to touch the highest award more often than lesser skilled players.

Note that, as described herein, the results of the slot spin results across different machines (connected to the same network) should all be identical because all of the results are pulled from a "finite pool" of results (stored in a database). Thus, if two players play the same number of spins, their final total of win credits (from the slot game) should be equal. In one embodiment, the amount of win credits that the player would win (if all possible spins are spun before the tournament time is up) would be $2,000 win credits (or other number). An amount of win credits that the player can win playing the skill games (also referred to herein as side games) assuming the player plays perfectly would be $20,000 (or other number). Note that different players would receive the identical skill games up until the players play differently (e.g., touch a different object in the skill game or touch the same object at a different time, etc.) If different players played the skill game exactly the same (e.g., touched the exact same areas of the screen at the exact same corresponding points in time in the skill game) then their results would be identical (hence the different results would be based on the player's skill). Thus, if robots were playing who played the game (both the slot game and the skill game) perfectly, then each robot would end up with the same number of win credits when the tournament is over (but of course in real life this is not the case with human players). As described herein, the winning from the slot game (win credits) are added to the winnings from the skill (side) (also win credits) into a total number of win credits which is accumulated for each player throughout the game (this accumulated amount of win credits is what is displayed to the player (e.g., see FIG. 17). The accumulated win credits at the end of the game (tournament) is what is used in the ranking to determine each player's final award/prize (if any).

Note that if a first player plays just one round of the skill game (assuming a positive number of win credits won) and then plays only the slot game thereafter (ignoring the skill game) this first player will beat out all other players who play only the slot game (assuming playing the same number of spins as the first player) but never played the skill game. This is because, since the slot game would all have identical results, by playing the skill game even once will give the first player an added number of win credits that the slot only players won't have. Typically, most players playing the tournament will play the skill game throughout the tournament and then therefore would beat any slot-only players quite easily. One exception would be if the skill players receive penalties for poor play then they can lose win credits and thus in theory fall behind the players who play the slot game only without playing the tournament (assuming these players do not get any penalties in the skill game for not playing the skill game). In a very unlikely scenario, a player in the tournament who only plays the slot game can beat out all of the other players who play the slot game and the skill game if all of the skill players cumulatively score negative (lose win credits) on the skill game (which is highly unlikely). Note that while it is possible for players to play the slot game and not the skill game (by just continuously pressing spin and ignoring the skill game), it is not possible for players to play only the skill game and not the slot game (since the spin button which initiates the slot game will also initiate (drive) the skill game).

A typical tournament can last 5 minutes and allow for 60-70 spins when the player is continuously pressing the spin button, although of course other durations and numbers of spins can be used as well.

It is noted that as described herein, all of embodiments described herein can be applied to a plurality of machines/computers in a tournament setting.

In another embodiment, all of the embodiments described herein can also be applied to machines/computers not running in a tournament setting. In a non-tournament setting, the player credits would be merged with the win credits (and they would just be referred to as win credits). The player would purchase win credits (by inserting cash or a ticket into a bill validator) and would be credited the respective amount of win credits (e.g., putting a $10 bill into the bill validator will credit the player $10 in win credits. All wins on the machine are paid in win credits. When the player wishes to cash out, the player can push a cash-out button on the machine and the player can be dispensed a ticket which can then be redeemed (at a cashier or a ticket redemption machine) for cash. The player can also be paid by requesting an electronic funds transfer of the cash value of the win credits into the player's bank account.

In a further embodiment, sponsors can advertise on any of the games described herein during a tournament (or during regular game play not in a tournament). A sponsor is a company that is typically not affiliated with the company offering the game or tournament but wishes to advertise their products on the games. The sponsor would pay money to the game provider and in exchange, the game provider (which can be the company that distributes the tournament software) can make graphic advertisements for the sponsor available on the games. The advertisements can appear alongside the actual game or can be embedded in the game itself. A player can click the advertisement and it would bring up an incentive for the player. The incentive can be a coupon, additional points (e.g., if the players are playing for win credits then the incentive can be free win credits, or if the players are playing for points then the incentive can be free points, or any other quantity that could benefit the player).

Figure 32:
FIG. 32 is a screen shot of an example of sponsoring advertisements, according to an embodiment.

FIG. 32 is a screen shot of an example of sponsoring advertisements, according to an embodiment.

Shown is a 3×3 reeled game. Alongside the game is an advertisement 3200 for a sponsor. The player can click the advertisement and it can bring up another window alongside the game so that the game play would not be occluded, in other words the area on the right which shows the advertisement 3200 would then open another window over the advertisement with more information regarding the advertiser (also referred to as sponsor).

Figure 33:
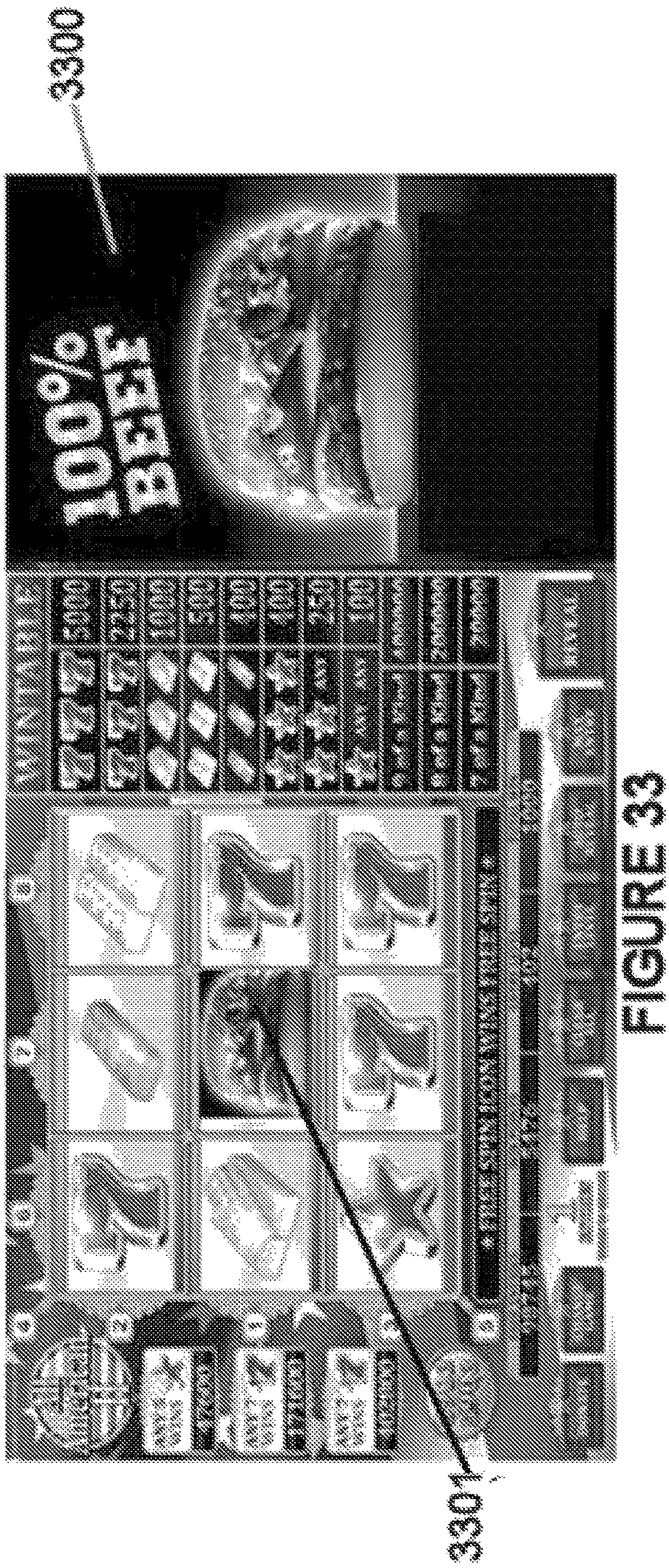
FIG. 33 is a screen shot of an example of sponsoring advertisements, according to an embodiment.

FIG. 33 is a screen shot of an example of sponsoring advertisements, according to an embodiment.

Alongside the game is an advertisement 3300. A sponsored symbol 3301 is present in the game reels itself. The sponsored symbol 3301 can be added to the reels after a game has already completed (so as to not affect the gameplay). In another embodiment, the sponsored symbol would replace another symbol on the reel mapping (for example, all cherries would be replaced with the sponsored symbol). In this way, a slot machine game can be offered with sponsored symbols that cycle among different sponsors but the math of the game would not change because all that is changing is the symbol itself (but not the frequency, etc.)

The player can select either the sponsored symbol 3301 and/or the advertisement 3300 which would bring up another page over the advertisement 3300 (but would not cover any portion of the slot game at all).

Figure 34:
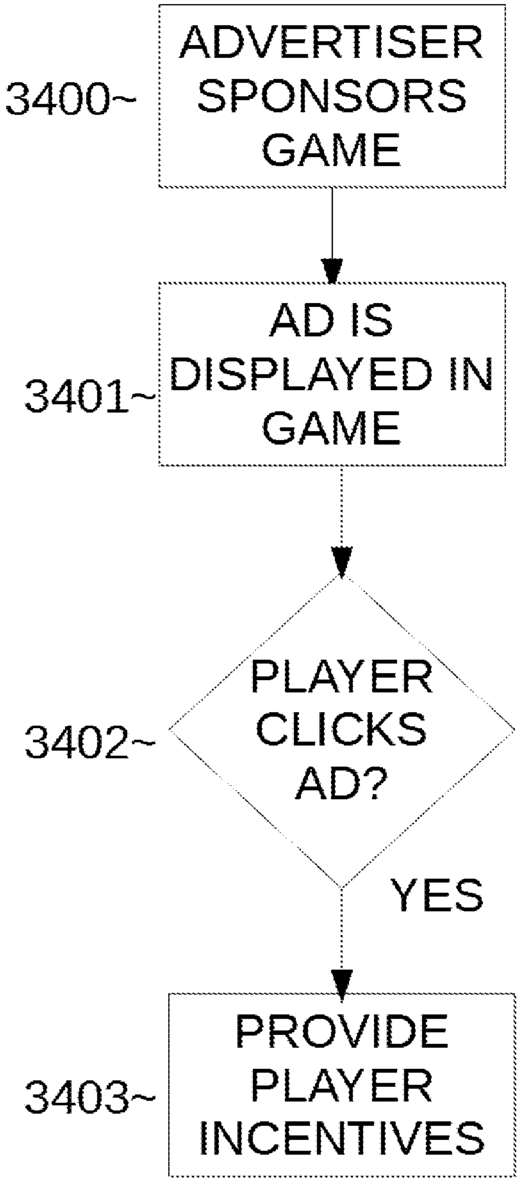
FIG. 34 is a flowchart illustrating an exemplary method of offering sponsored advertisements, according to an embodiment.

FIG. 34 is a flowchart illustrating an exemplary method of offering sponsored advertisements, according to an embodiment.

In operation 3400, the advertiser (also referred to as sponsor) sponsors a game. This can be done by the sponsor paying the game provider money (or other remuneration) in exchange for a quantity of advertising. The quantity can be number of individual spins players, number of individual players, number of tournaments, amount of time the advertisement is displayed, etc. The game provider would typically provide the sponsor with some type of quantifiable amount of advertising in exchange for the sponsor's money. The sponsor would also provide the game provider images of the advertisements and any incentives the sponsor would provide.

From operation 3400, the method proceeds to operation 3401, which displays the advertisement in the game. The advertisement can be displayed alongside the game or inside the game itself (e.g., as a game symbol, etc.)

From operation 3401, the method proceeds to operation 3402, which determines whether the player clicks an advertisement. If the player does not click an advertisement then typically the further information displayed in operation 3403 would not be displayed.

If in operation 3402, the player clicks an advertisement (regardless of where the advertisement appears), then the method proceeds to operation 3403, which provides the player incentives. An additional advertisement would appear, such as further information about the advertised product and any information about incentives the player may receive (e.g., an additional free 10 win credits, an additional free 20 points, an additional free 15 play credits, etc.) which can automatically be added to the player's machine.

An additional window may pop up requesting information from the player, for example it can request the players name, cell phone number (so a coupon can be texted to the player's cell phone), email address (so a coupon can be emailed to the player's email address), etc. A special coupon code can also be displayed which the player can use (type in) at a later time when ordering at the sponsor's web site in order to redeem the incentive (e.g., a 20% discount on a product).

In one embodiment, it would not matter where the player clicks the advertisement (whether it is in the game itself or alongside the game). In another embodiment, depending on where the player clicks an advertisement would determine what the player gets. For example, if the player clicks an advertisement alongside the game the player may get additional win credits, points, or play credits, etc., but not a coupon, while if the player clicks an advertisement inside the game itself then the player would get both the win credits, points, or play credits, etc., and also a coupon (for a discount on a product or service).

Figure 35:
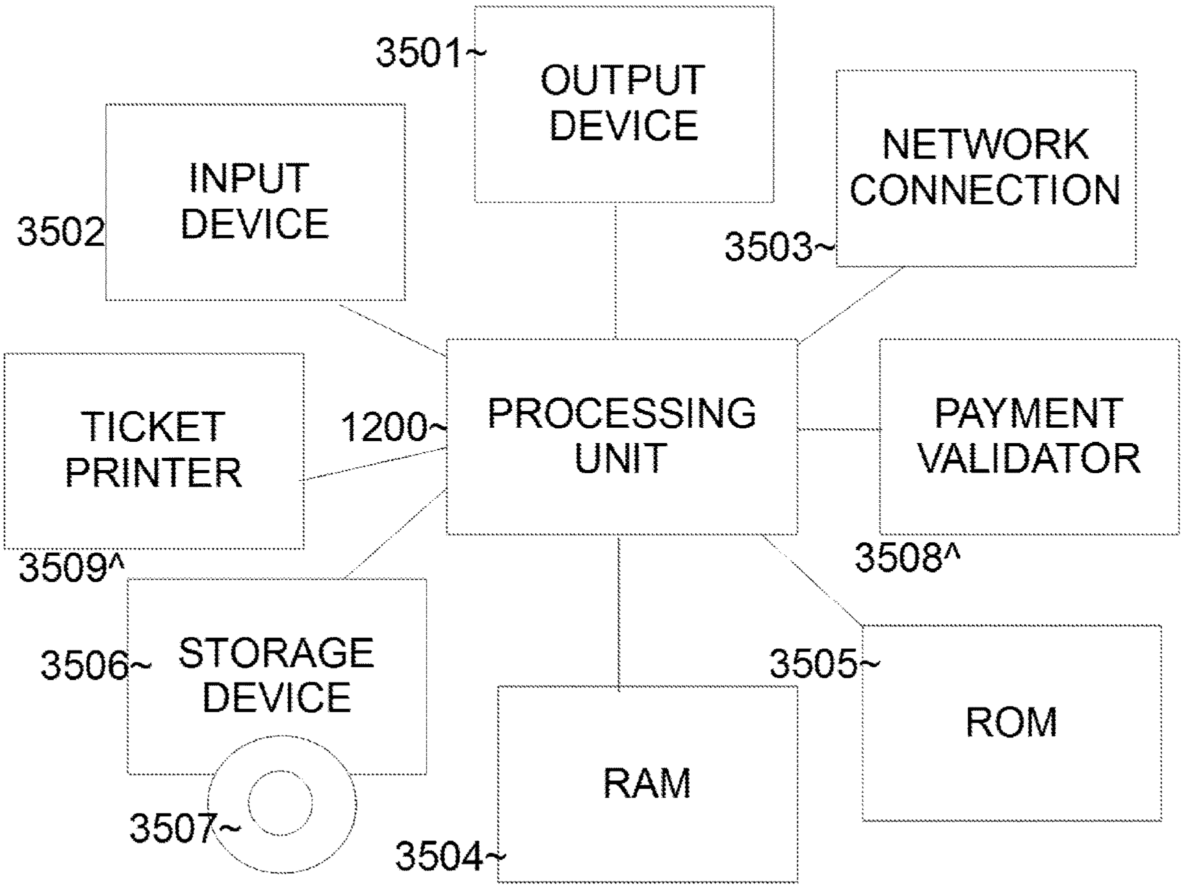
FIG. 35 is a block diagram illustrating exemplary hardware that can be used to implement an electronic version of the methods described herein.

FIG. 35 is a block diagram illustrating exemplary hardware that can be used to implement the game described herein, according to an embodiment. The hardware in FIG. 12 can be used to implement a computer implementing the game described herein and/or a server that is serving the game to a computer which is displaying the game to a player. Such a server can interface with a social networking site (e.g., FACEBOOK, MYSPACE, etc.) that is used to coordinate the entire game and communicate with the players as well as a server used by the social network site. The hardware can also be, for example, an electronic gaming machine (EGM) used in casinos such as a video slot machine. The hardware can also be a personal computer or personal computing device (e.g., laptop, desktop, cell phone, tablet, etc.) playing the game using the Internet. The hardware can also be any other type of device, working individually or in conjunction with other devices.

A processing unit 3500 (such as a microprocessor and any associated components) is connected to an output device 3501 (such as an LCD monitor, touch screen, CRT, etc.) which is used to display to the player any aspect/output/state of the method, and an input device 3502 (e.g., buttons, a touch screen, a keyboard, mouse, etc.) which can be used to input from the player any decision/input made by the player. All methods described herein can be performed by the processing unit 3500 by loading and executing respective instructions. Multiple such processing units can also work in collaboration with each other (in a same or different physical location). The processing unit 3500 can also be connected to a network connection 3503, which can connect the electronic gaming device to a computer communications network such as the Internet, a LAN, WAN, etc. The processing unit 3500 is also connected to a RAM 3504 and a ROM 3505. The processing unit 3500 is also connected to a storage device 3506 which can be a disk drive, DVD-drive, CD-ROM drive, flash memory, etc. A non-transitory computer readable storage medium 3507 (e.g., hard disk, CD-ROM, etc.), can store a program which can control the electronic device to perform any of the methods described herein and can be read by the storage device 3506.

The processing unit 3500 can also be connected to a payment validator 3508. The payment validator can be a bill acceptor which accepts currency, identifies it as being valid (typically by using an optical scanner), and then credits the inserted bill amount to the machine (for example inserting a $10 bill will credit the machine with $10 in credits). These credits can be used to buy into the tournament, or if the non-tournament mode be used to play the games. The bill acceptor can also accept cashless tickets as part of a 'ticket-in-ticket-out" system, in which tickets (cashless vouchers) have cash value and can be inserted into the payment validator 3508. The validator 3508 validates the ticket (typically be optically scanning a bar-code), communicating electronically with a casino database to verify the ticket is authentic, and once authenticated then crediting the machine with the respective amount of credits. The payment validator 3508 can also include a card reader which can read cards (e.g., with a magnetic stripe or other electronic encoding) so that an account number can be accessed. The cards can be a credit card, player loyalty card, specific casino payment card, or any card that can provide electronic access to a monetary amount owned by the player (owner of the card) which the player can utilize for depositing money and then playing the machine. If such a card is used, then the player can optionally enter (using a keypad) an amount the player wishes to withdraw from the account associated with the card to credit to the machine. The player can also the card in this matter to request that the machine electronically transfer any credits on the machine (e.g., win credits) to the player's account associated with the card.

The processing unit 3500 can also be connected to a ticket printer 3509 which can print tickets (cashless vouchers). When the player cashes out on the machine (indicated to the machine that the player wishes to cash out and terminate by, typically by pressing a button), a ticket is printed by the ticket printer 3509 which carries the amount of credits left on the machine. Typically, in the tournament mode the player cannot cash out his win credits as they have no direct cash value, but in the non-tournament mode the player would be allowed to cash out his/her win credits and redeem them for cash. This ticket can then be used to play other machines in the casino by inserting them into that machine's payment validator. The ticket can also be used to redeem for cash by inserting it into a ticket redemption machine (kiosk) which receives a ticket, validates it (typically by scanning the barcode), and then dispenses an identical amount of cash to what the ticket's value is.

While one processing unit is shown, it can be appreciated that one or more such processor can work together (either in a same physical location or in different locations) to combine to implement any of the methods described herein. Programs and/or data required to implement any of the methods/features described herein can all be stored on any non-transitory computer readable storage medium (volatile or non-volatile, such as CD-ROM, RAM, ROM, EPROM, microprocessor cache, etc.)

Figure 36:
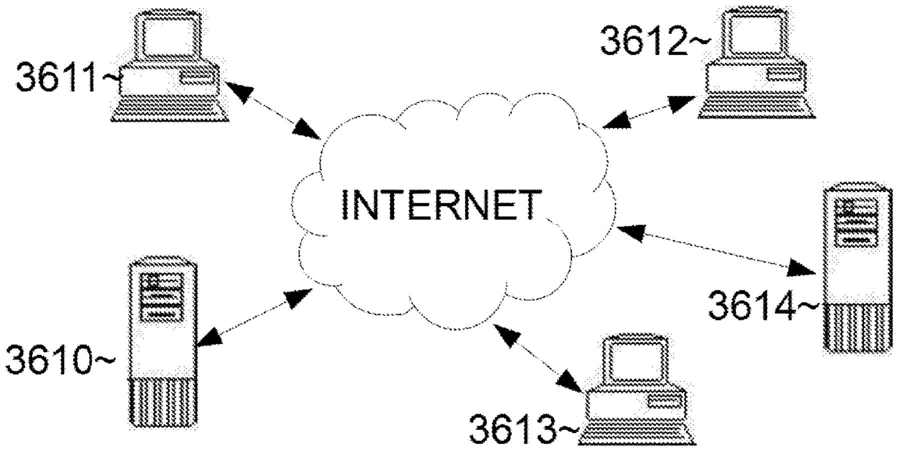
FIG. 36 is a block diagram illustrating an exemplary network configuration to implement a player playing an online version of the methods described herein.

FIG. 36 is a network diagram showing a network structure for a social networking web site and players, according to an embodiment. The online game which awards and stores loyalty points can also be accomplished by the system illustrated in FIG. 23.

A computer communications network (such as the Internet) can be used to connect a host server 3610 which can host and serve a social networking site. Note that while FIG. 36 shows only one server as the host server 3610, the host server 3610 can encompass numerous servers all cooperating with each other (whether in the same physical location or not). The host server 3610 communicates with players 3611, 3612, 3613 through the Internet (or other computer communication network) and can implement any of the methods herein by executing computer code programmed accordingly. Game server 3614 can also implement all games and methods described herein on the site by executing computer code programmed accordingly. The game server 3614 is connected to the Internet and can communicate with all of the players 3611, 3612, 3613 directly or indirectly through the social networking site hosted by the host server 3610. The game server 3614 can cooperate with the host server 3610 so that the games run on the game server 3614 can be integrated into the social networking site hosted by the host server 3610. The game server can also be optional and all of the games can be also hosted on the host server 3610, whereby the integration of the games served/hosted by the game server 3614 will appear embedded in the social networking site hosted by the host server 3610 such that players would typically not realize (or care) that multiple servers are cooperating in order to play games on the social networking site. All of the communications described herein can be effectuated using such a network configuration. Typically, the communications are effectuated on the social networking site itself, thus the players 3611, 3612, 3613 should be logged into the social networking site in order to participate herein, although logging in is not required (e.g., communications can be transmitted using other methods, such as email, IRC chat, instant message, etc.) The host server 3610 can communicate with any of the devices illustrated in FIG. 1.

All components herein can be distributed across different such components as needed. For example, a single server as mentioned herein can be distributed across numerous different servers and locations. A processor (or processing unit) can also be distributed across multiple processors in a same or different computer (at a same or different location). The electronic components described herein represent an abstraction but it can be appreciated that the computer systems implementing the methods herein can be more numerous and interconnected than illustrated herein.

If a player is playing the game described herein on a social networking site or other type of hosted environment, then the player's computer would cooperate with the social networking server in order to present the game to the player. The player's computer would perform the instructions necessary to display the game while the remote server can determine the results (e.g., the final arrangement) and communicate this result via the Internet to the player's computer so that the player's computer can accurately display the result. The remote server may track and account for all credits wagered and won/lost while the player's computer can display the amount of credits owned or won at the direction of the remote server so the player cannot tamper with these amounts. All games described herein are considered to be played on the site described herein.

Any description of a component or embodiment herein also includes hardware, software, and configurations which already exist in the prior art and may be necessary to the operation of such component(s) or embodiment(s).

Further, the operations described herein can be performed in any sensible order. Any operations not required for proper operation can be optional. Further, all methods described herein can also be stored on a computer readable storage to control a computer. All variations and features described herein can be combined with any other features described herein without limitation.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

The invention claimed is:

1. A method, comprising:

executing on at least one or more processors, the following operations:

implementing a slot machine game utilizing reels;

displaying an advertisement as a symbol in one of the reels which replaces another symbol on the reels;

enabling a player to click the advertisement; and in response to the click, displaying a further advertisement relating to the advertisement.

2. An apparatus, comprising:

at least one or more processors configured to read and execute computer readable instructions stored in a computer readable storage medium, which when executed, cause the at least one or more processors to:

implement a slot machine game utilizing reels;

display an advertisement as a symbol in one of the reels which replaces another symbol on the reels;

enable a player to click the advertisement; and in response to the click, display a further advertisement relating to the advertisement.

* * * * *